US012404778B2

(12) United States Patent
Johnson et al.

(10) Patent No.: US 12,404,778 B2
(45) Date of Patent: Sep. 2, 2025

(54) TURBINE ENGINE WITH A ROTOR SEAL ASSEMBLY

(71) Applicant: GENERAL ELECTRIC COMPANY, Schenectady, NY (US)

(72) Inventors: Steven Douglas Johnson, Milford, OH (US); Kevin Randall McManus, Cincinatti, OH (US); Rahul Anil Bidkar, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/483,173

(22) Filed: Oct. 9, 2023

(65) Prior Publication Data

US 2024/0035390 A1 Feb. 1, 2024

Related U.S. Application Data

(63) Continuation of application No. 17/338,807, filed on Jun. 4, 2021, now Pat. No. 11,821,320.

(51) Int. Cl.
*F01D 11/22* (2006.01)
*F01D 11/00* (2006.01)
*F01D 11/02* (2006.01)

(52) U.S. Cl.
CPC .......... *F01D 11/001* (2013.01); *F01D 11/025* (2013.01); *F01D 11/22* (2013.01); *F05D 2220/323* (2013.01); *F05D 2240/11* (2013.01); *F05D 2240/80* (2013.01); *F05D 2260/38* (2013.01)

(58) Field of Classification Search
CPC ...... F01D 11/001; F01D 11/025; F01D 11/22; F05D 2220/323; F05D 2240/11; F05D 2240/80; F05D 2260/38
See application file for complete search history.

(56) References Cited

U.S. PATENT DOCUMENTS 5,100,158 A 3/1992 Gardner
5,143,384 A 9/1992 Lipschitz
5,301,957 A 4/1994 Hwang
5,509,664 A 4/1996 Borkiewicz
6,145,843 A 11/2000 Hwang
(Continued)

FOREIGN PATENT DOCUMENTS

CN 103237960 A 8/2013
CN 110017211 A 7/2019
(Continued)

OTHER PUBLICATIONS

Grondahl et al., "Film Riding Leaf Seals for Improved Shaft Sealing", Proceeding of ASME Turbo Expo 2010: Power for Land, Sea and Air, Jun. 14-18, 2010, 8 pages, Glasgow, UK.
(Continued)

*Primary Examiner* — Elton K Wong
*Assistant Examiner* — Theodore C Ribadeneyra
(74) *Attorney, Agent, or Firm* — Dority & Manning, P.A.

(57) ABSTRACT

A turbine engine having a stator, a rotor, and a seal assembly. The rotor being rotatable about a rotational axis. The seal assembly having a carriage assembly, a seal body and a biasing element. The carriage assembly being carried by the stator. The carriage assembly defining a seal cavity. The seal body being provided within the seal cavity.

18 Claims, 13 Drawing Sheets

(56) References Cited

U.S. PATENT DOCUMENTS

| | | | |
|---|---|---|---|
| 6,505,837 B1 | 1/2003 | Heshmat | |
| 6,572,115 B1 | 6/2003 | Sarshar et al. | |
| 6,655,696 B1 | 12/2003 | Fang et al. | |
| 6,692,006 B2 | 2/2004 | Holder | |
| 6,811,154 B2 | 11/2004 | Proctor et al. | |
| 7,726,660 B2 | 6/2010 | Datta | |
| 7,914,007 B2 | 3/2011 | Berard | |
| 8,002,285 B2 | 8/2011 | Justak | |
| 8,056,902 B2 | 11/2011 | Roddis | |
| 8,641,045 B2 | 2/2014 | Justak | |
| 9,045,994 B2 | 6/2015 | Bidkar et al. | |
| 9,115,810 B2 | 8/2015 | Bidkar et al. | |
| 9,145,785 B2 | 9/2015 | Bidkar et al. | |
| 9,255,642 B2 | 2/2016 | Bidkar et al. | |
| 9,359,908 B2 | 6/2016 | Bidkar et al. | |
| 9,587,746 B2 | 3/2017 | Bidkar et al. | |
| 10,060,280 B2 | 8/2018 | Crawley, Jr. et al. | |
| 10,161,259 B2 | 12/2018 | Gibson et al. | |
| 10,190,431 B2 | 1/2019 | Bidkar et al. | |
| 10,352,455 B2 | 7/2019 | Berard | |
| 10,443,424 B2 | 10/2019 | McCaffrey | |
| 10,539,034 B2 | 1/2020 | Miller | |
| 10,633,997 B2 | 4/2020 | Scimeca | |
| 10,781,709 B2 | 9/2020 | Sen | |
| 2007/0053772 A1 | 3/2007 | Couture, Jr. et al. | |
| 2007/0274829 A1* | 11/2007 | Chevrette | F16J 15/442 415/231 |
| 2008/0056895 A1 | 3/2008 | Senoo | |
| 2012/0223483 A1 | 9/2012 | Bidkar et al. | |
| 2014/0008871 A1 | 1/2014 | Bidkar et al. | |
| 2014/0062024 A1 | 3/2014 | Bidkar et al. | |
| 2015/0159498 A1 | 6/2015 | Mukhopadhyay et al. | |
| 2016/0010480 A1 | 1/2016 | Bidkar et al. | |
| 2016/0097291 A1 | 4/2016 | Hayford et al. | |
| 2016/0130963 A1 | 5/2016 | Wilson et al. | |
| 2016/0138412 A1 | 5/2016 | Rioux | |
| 2016/0281531 A1* | 9/2016 | Dube | F01D 11/001 |
| 2016/0376907 A1 | 12/2016 | O'Leary et al. | |
| 2017/0051621 A1 | 2/2017 | Ackermann et al. | |
| 2017/0370474 A1 | 12/2017 | Berard | |
| 2018/0372229 A1 | 12/2018 | Bidkar et al. | |
| 2019/0072186 A1 | 3/2019 | Bidkar et al. | |
| 2019/0085712 A1 | 3/2019 | Wesling et al. | |
| 2019/0203842 A1 | 7/2019 | Bidkar et al. | |
| 2019/0218927 A1 | 7/2019 | Difrancesco | |
| 2020/0040735 A1 | 2/2020 | Millier et al. | |
| 2020/0063588 A1 | 2/2020 | Morliere et al. | |
| 2020/0318489 A1 | 10/2020 | Webb | |
| 2021/0148244 A1 | 5/2021 | Freeman | |
| 2022/0235667 A1 | 7/2022 | Mizumi et al. | |

FOREIGN PATENT DOCUMENTS

| | | | |
|---|---|---|---|
| EP | 1707751 | B1 | 11/2015 |
| EP | 3234419 | A1 | 10/2017 |
| EP | 3263842 | A1 | 1/2018 |
| WO | 2019/224463 | A1 | 11/2019 |

OTHER PUBLICATIONS

Munson et al., "Development of Film Riding Face Seals for a Gas Turbine Engine", Tribology Transactions, 35:1. 65-70, DOI: 10.1080/10402009208982090, Published Mar. 25, 2008, 7 pages, vol. 35 (1992).

Steinetz et al., "Advanced Seal Technology Role in Meeting Next Generation Turbine Engine Goals", RTO AVT Symposium on "Design Principles and Methods for Aircraft Gas Turbine Engines", 14 pages, May 11-15, 1998, Toulouse France.

* cited by examiner

TURBINE ENGINE WITH A ROTOR SEAL ASSEMBLY

CROSS-REFERENCE TO RELATED APPLICATION(S)

This application claims priority to U.S. patent application Ser. No. 17/338,807, filed Jun. 4, 2021, now U.S. Pat. No. 11,821,320, which is incorporated herein by reference in its entirety.

TECHNICAL FIELD

The disclosure generally relates to a turbine engine, and more specifically to a rotor seal assembly for a gas turbine engine.

BACKGROUND

Turbine engines, and particularly gas turbine engines, are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes. The gas turbine engine can be arranged as an engine core comprising at least a compressor section, a combustor section, and a turbine section in axial flow arrangement and defining at least one rotating element or rotor and at least one stationary component or stator. A seal assembly, specifically a labyrinth seal assembly, can be located between the stator and the rotor and be used to reduce leakage fluids between the rotor and stator. In a bypass turbofan implementation, an annular bypass air flow passage is formed about the core, with a fan section located axially upstream of the compressor section.

BRIEF DESCRIPTION

In one aspect, the disclosure relates to a turbine engine comprising an engine core comprising at least a compressor section, a combustor section, and a turbine section in axial flow arrangement defining an axial direction and an engine centerline, and defining a rotor and a stator, a carriage assembly carried by the stator and having a seal seat defining a seal cavity, and a seal assembly having a floating seal body, at least partially located within the seal cavity and having a first seal face confronting the rotor, and a biasing element located within the seal cavity and biasing the floating seal body such that the seal face is biased toward the rotor.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
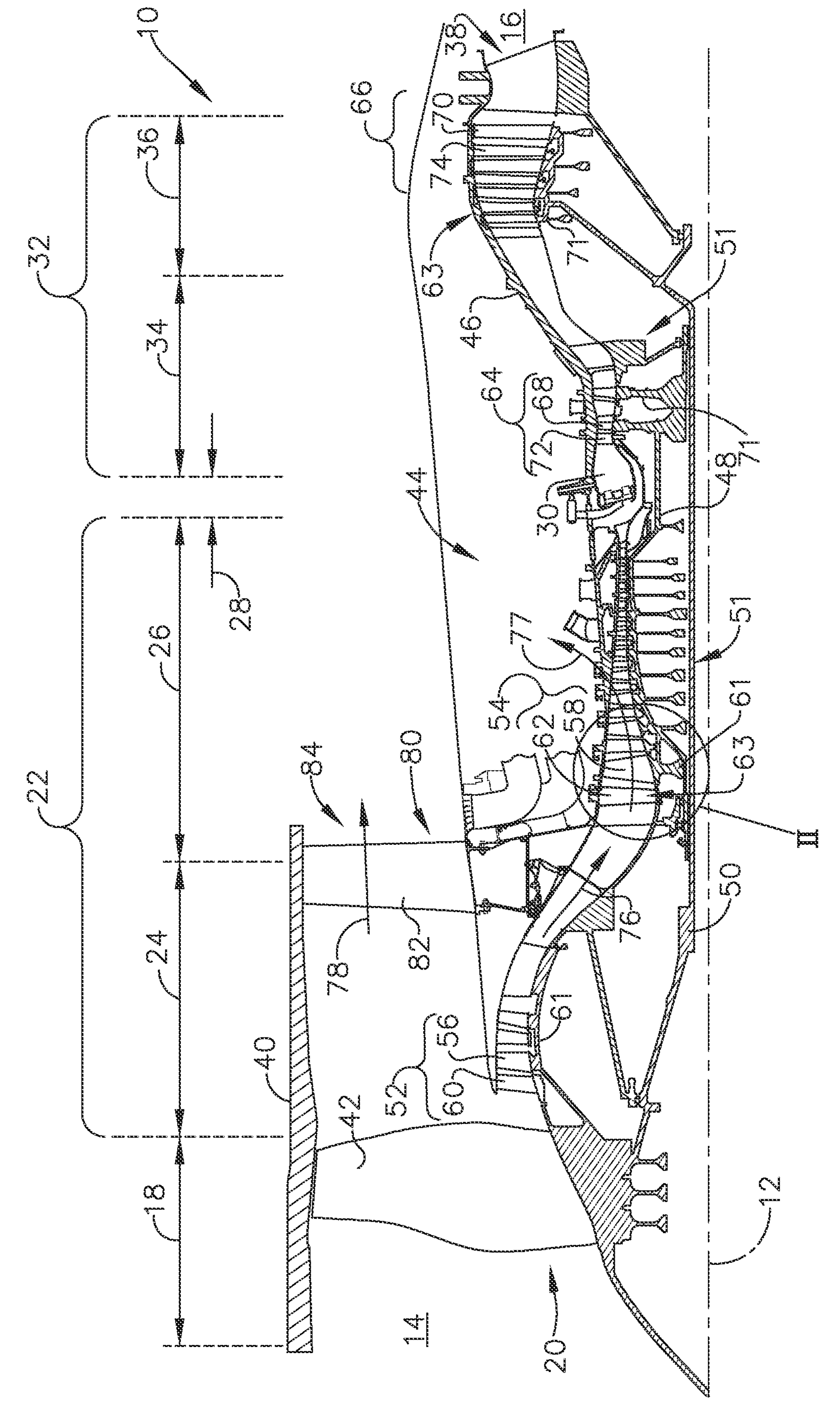
FIG. 1 is a schematic cross-sectional view of a gas turbine engine for an aircraft.

Aspects of the disclosure described herein are broadly directed to a rotor seal assembly having a seal with a floating portion confronting a rotor of the gas turbine engine and a static portion carried by a stator of the gas turbine engine. Specifically, the rotor seal assembly includes a carriage assembly carried by the gas turbine engine and having a seal seat defining a seal cavity, and a seal assembly having a floating seal body including a first seal face opposing the rotor. In some instances, a biasing element can be positioned between the carriage assembly and the floating seal body such that the floating seal body can move between a first position and a second position with the first position being displaced radially inward with respect to the rotor when compared to the second position. The floating seal body can further include an internal passage fluidly coupling an inlet on a second seal face defined as an upstream or axially forward face of the floating seal body to an outlet provided on a third seal face radially opposite the first seal face. The outlet can be fluidly coupled to an interior of the biasing element.

The rotor seal assembly can provide for a dynamic sealing environment through the use of the biasing element moveable between the first position and the second position. For the purposes of illustration, one exemplary environment within which the rotor seal assembly can be utilized will be described in the form of a turbine engine. Such a turbine engine can be in the form of a gas turbine engine, a turboprop, turboshaft or a turbofan engine having a power gearbox, in non-limiting examples. It will be understood, however, that aspects of the disclosure described herein are not so limited and can have general applicability within other sealing systems. For example, the disclosure can have applicability for a rotor seal assembly in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine, specifically a gas turbine engine 10 for an aircraft. The gas turbine engine 10 has a generally longitudinally extending axis or engine centerline 12 extending forward 14 to aft 16. The gas turbine engine includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The gas turbine engine 10 as described herein is meant as a non-limiting example, and other architectures are possible, such as, but not limited to, the steam turbine engine, the supercritical carbon dioxide turbine engine, or any other suitable turbine engine The fan section 18 includes a fan casing 40 surrounding the fan 20. The fan 20 includes a set of fan blades 42 disposed radially about the engine centerline 12. The HP compressor 26, the combustor 30, and the HP turbine 34 form an engine core 44 of the gas turbine engine 10, which generates combustion gases. The engine core 44 is surrounded by core casing 46, which can be coupled with the fan casing 40.

A HP shaft or spool 48 disposed coaxially about the engine centerline 12 of the gas turbine engine 10 drivingly connects the HP turbine 34 to the HP compressor 26. A LP shaft or spool 50, which is disposed coaxially about the engine centerline 12 of the gas turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which can collectively define a rotor 51.

The LP compressor 24 and the HP compressor 26 respectively include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the gas turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24. The pressurized airflow 76 and the combustion gases can together define a working airflow that flows through the fan section 18, compressor section 22, combustor section 28, and turbine section 32 of the gas turbine engine 10.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the gas turbine engine 10 through a stationary vane row, and more particularly an outlet guide vane assembly 80, comprising a set of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the gas turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
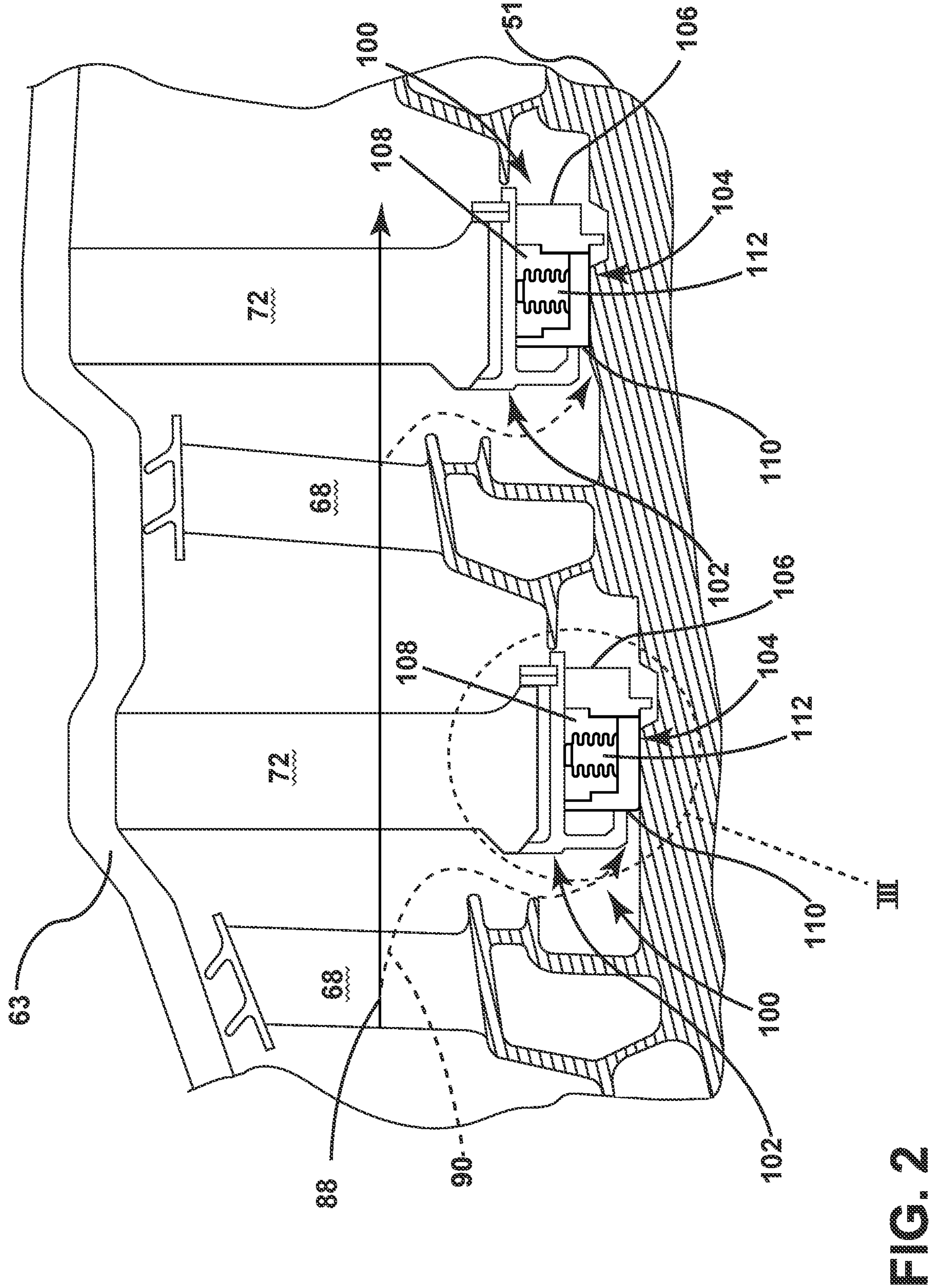
FIG. 2 is a schematic cross-sectional view of the gas turbine engine of FIG. 1, further including a rotor and a stator with a rotor seal assembly disposed therebetween.

FIG. 2 further illustrates the rotor 51, the stator 63, and a rotor seal assembly 100 for the gas turbine engine 10 as seen from section II of FIG. 1. In the example shown, at least a portion of the rotor seal assembly 100 can be provided in the HP turbine 32 and depend from a portion of the stator 63, specifically from the turbine vanes 72 that extend from the outer portions of the stator 63 and located between two adjacent turbine blades 68. It will be appreciated, however, that the rotor seal assembly 100 can be positioned between any suitable rotating and stationary component of the gas turbine engine 10 within any portion of the gas turbine engine 10 such as, for example, in the fan section 18, the compressor section 22, or the turbine section 32. As such, the rotor seal assembly 100 can depend from any suitable stationary component such as, but not limited to, the compressor vanes 60, 62, or the turbine vanes 72, 74. For purposes of this disclosure, the turbine vane 72, or any other vane (e.g., the static vanes 60, 62, 72, 74), which depends form the stator 63 can be collectively referred to as the stator 63.

The rotor seal assembly 100 can include a carriage assembly 102 carried by the stator 63 and having a seal seat 106 defining a seal cavity 108, and a seal assembly 104 at least partially located within the seal cavity 108 and having a segmented floating seal body 110. A biasing element 112 be located within the seal cavity 108 between the floating seal body 110 and the carriage assembly 102.

During operation of the gas turbine engine 10, a working fluid 88 can flow over the turbine blades 68 and turbine vanes 72. In the specific example, the working fluid 88 can be defined by the pressurized airflow 76, however, it will be appreciated that he working fluid 88 can be any suitable working fluid or airflow such as, but not limited to, the pressurized airflow 76, combustion gases, an ambient airflow, any combination thereof, or any other suitable fluid as described herein. The majority of the working fluid 88 can flow over the turbine vanes 72 and the turbine blades 68 to define a working fluid path. A leakage fluid 90 diverges from the working fluid 88 and enters the space between the compressor blade 58 and the compressor vane 62, and flows between a radially inner portion of the stator 63 (e.g., the radially inner portions of the turbine vanes 72) and the rotor 51 defining. The rotor seal assembly 100 can reduce or otherwise eliminate the amount of leakage fluid 90 that flows from an upstream portion of the turbine vane 68 to a downstream portion of the turbine vane 68 by establishing a labyrinth between the stator 63 and the rotor 51. In other words, the rotor seal assembly 100 can create a torturous path for the leakage fluid 90, thus either reducing or eliminating the amount of leakage fluid 90 that is able to flow around the radially inner portion of the stator 63.

Figure 3A:
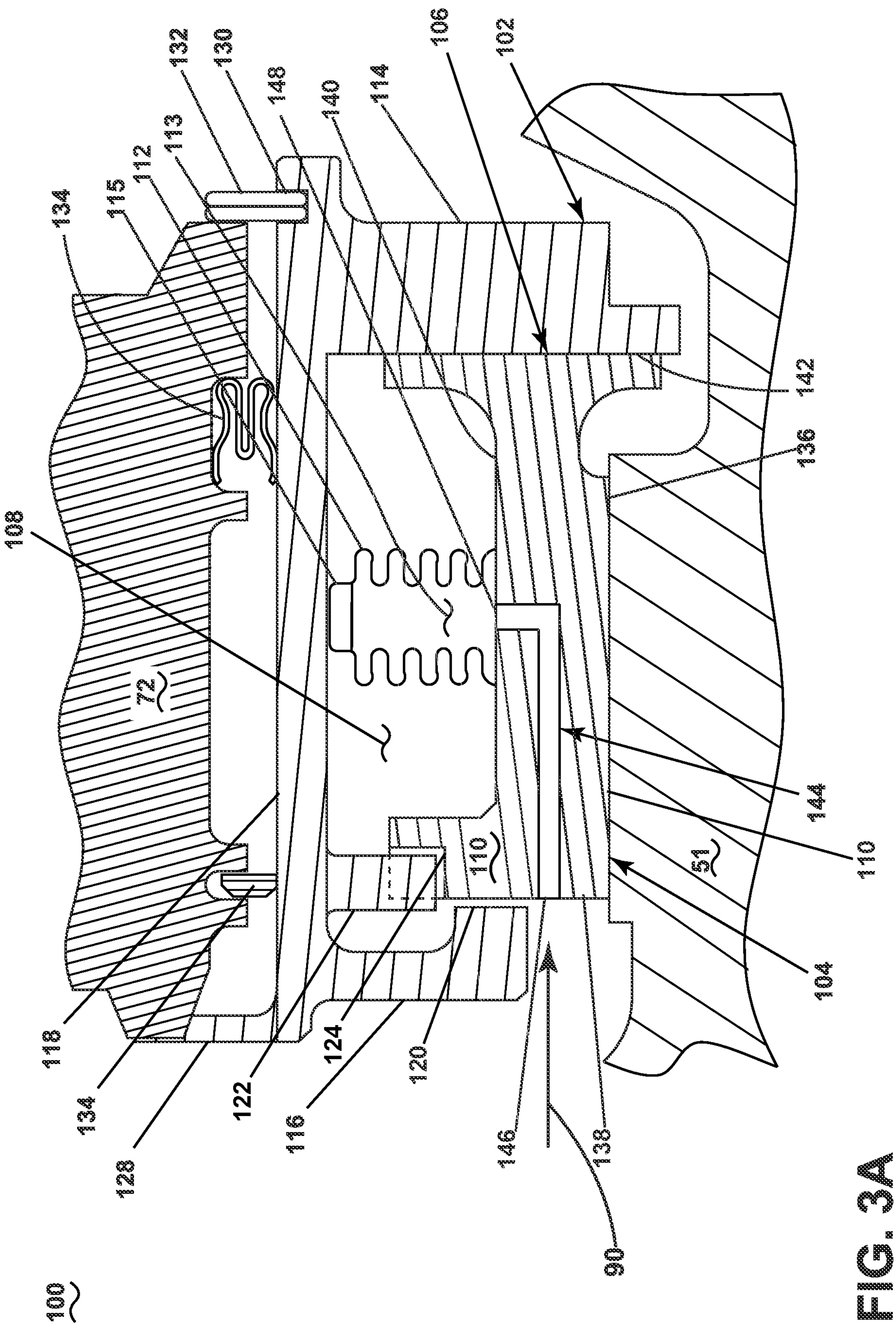
FIG. 3A is an enlarged schematic cross-sectional view of the rotor seal assembly of FIG. 2, further including a carriage assembly, a seal assembly, and a biasing element in a first position with respect to the rotor.
Figure 3B:
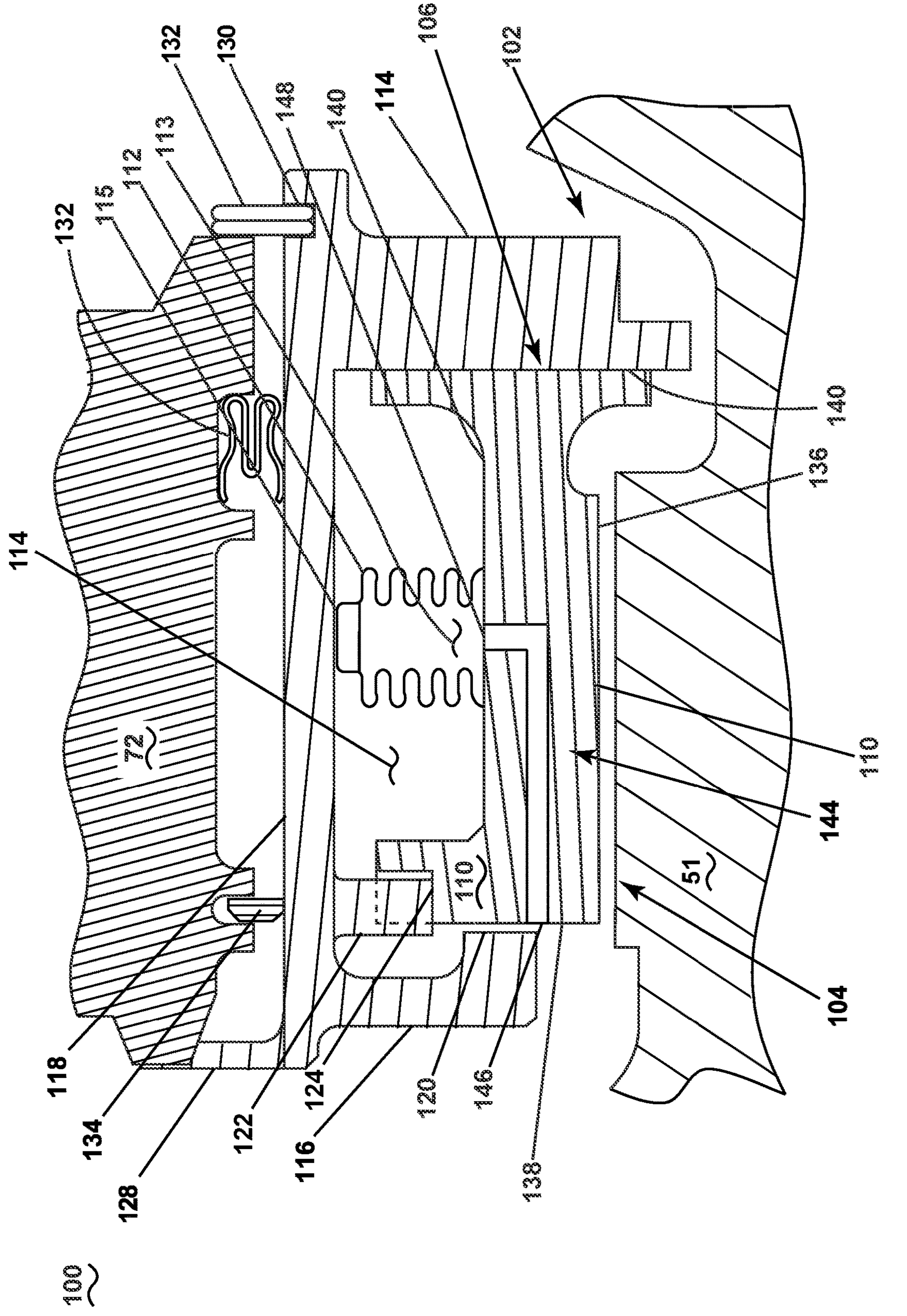
FIG. 3B is an enlarged schematic cross-sectional view of the rotor seal assembly of FIG. 2, further including the carriage assembly, the seal assembly, and the biasing element in a second position with respect to the rotor.

FIGS. 3A-3B are schematic cross-sectional illustrations of the rotor seal assembly 100 in a first position (FIG. 3A) and a second position (FIG. 3B) as seen from enlarged area III of FIG. 2. As illustrated, the difference between the first position and the second position of the rotor seal assembly is that the seal assembly 104 is radially closer to the rotor 51 while in the first position than when in the second position. Further yet, the biasing element 112 in the first position can be expanded in the radial direction when compared to the biasing element 112 in the second position. As such, FIGS. 3A-3B illustrate a comparison of the rotor seal assembly 100 between the first position and the second position, respectively.

At least one of the carriage assembly 102 or the seal assembly 104 can extend about the entire periphery of the rotor 51 or otherwise be circumferentially continuous about the engine centerline 12. Additionally, or alternatively, at least one of the seal assembly 104 or the carriage assembly 102 can be segmented about the engine centerline 12. For example, the seal assembly 104 can be a segmented seal assembly 104 split into two or more segments about the engine centerline 12. The number of segments of the carriage assembly 102 can correspond to the number of segments of the seal assembly 104.

The biasing element 112 can extend within the seal cavity 108 between the carriage assembly 102 and the seal assembly 104 and be operably coupled to at least one of the floating seal body 110 or the carriage assembly 102 through any suitable method such as, but not limited to, adhesion, fastening, welding, or the like. The biasing element 112 can include a head 115, defined as a radially outer portion of the biasing element 112, that confronts at least a portion of the carriage assembly 102.

As illustrated, the biasing element 112 is a pneumatic bellows defining an interior 113, specifically a hollow interior. As such, a fluid can be introduced into the interior of the biasing element 112 to move the biasing element 112 from a contracted position (FIG. 3B) to an extended position (FIG. 3A), which results in a corresponding movement of the floating seal body 110. It is contemplated that the biasing element 112 can be biased to the contracted position. The biasing element 112 can be sized based on the location of the rotor seal assembly 100 within the gas turbine engine 10. For example, in the case of the pneumatic bellows, a number of folds or layers and the thickness of the pneumatic bellows can be increased or decreased based on the desired length of extension or contraction of the biasing element 112. Although illustrated as the pneumatic bellows, it will be appreciated that that the biasing element can be any other suitable biasing element such as, but not limited to, a leaf spring, a garter spring, flexures, or the like.

The carriage assembly 102 of the rotor seal assembly 100 can define the seal seat 106 defining the seal cavity 108. The seal seat 106 can take on many forms, but, as illustrated, the seal seat 106 includes a first wall 114, a second wall 116, and a third wall 118. Both the first wall 114 and the second wall 116 can extend radially inwardly from the stator 63, specifically the turbine vane 72, with the second wall 116 being upstream or axially forward the first wall 114. The third wall 118 can extend in the axial direction and interconnect the first wall 114 and the second wall 116. Together, the first wall 114, the second wall 116, and the third wall 118 can define the seal seat 106 and hence the seal cavity 108. It will be appreciated that the first wall 114, the second wall 116, and the third wall 118, and hence the seal seat 106, can be sized such that the seal assembly 104, and more specifically the floating seal body 110, can be at least partially received within the seal cavity 108. The first wall 114 and the second wall 116 together define a radial seal guide for the floating seal body 110. In other words, the floating seal body 110 can be free to move in the radial direction within the seal cavity 108 demarcated by the first wall 114 and the second wall 116.

The second wall 116 can include a tooth 120 confronting at least a portion of the floating seal body 110. The tooth 120 can be used to limit, restrict, or stop the leakage fluid from passing between the second wall 116 and the floating seal body 110 and into the seal cavity 108. It is contemplated that the tooth 120 can be designed to provide a minimal radial frictional load on the seal assembly 104, while still ensuring that the leakage fluid 90 is limited or otherwise stopped form flowing around the seal assembly 104 and into the seal cavity 108.

The seal seat 106 can further include a flange 122 that extends from a portion of the seal seat 106 and into the seal cavity 108. As a non-limiting example, the flange 122 can extend from a radially inner portion of the third wall 118 and into the seal cavity 108. In other words, the flange 122 can extend radially inwardly from a portion of the carriage assembly 102 and into the seal cavity 108. It will be appreciated, however, that the flange 122 can extend from any other suitable portion of the carriage assembly 102 and into the seal cavity 108. For example, the flange 122 can extend axially inwardly from the second wall 116 and axially into the seal cavity 108. A distal end of the flange 122 can confront the floating seal body 110. As a non-limiting example, the floating seal body 110 can include a seat 124 that the distal end of the flange 122 confronts, physical contacts, or is coupled to. As a non-limiting example, the flange 122 can be coupled to the seat 124 through any suitable coupling method such as, but not limited to, welding, adhesion, fastening, magnetism, friction, or any combination thereof. As the carriage assembly 102 is static and the flange 122 is coupled to or otherwise a portion of the carriage assembly 102, the flange 122 can be further defined as a static portion of the rotor seal assembly 100. As such, the flange 122 and the seat 124 can limit at least one of an axial, circumferential, or radial movement of the floating seal body 110.

The carriage assembly 102 can further include a tab 128 extending from the seal seat 106, specifically between the third wall 118 and the stator 63. The tab 128 can be used to physically couple the carriage assembly 102 to the stator 63. As illustrated, the tab 128 extends from an upstream or axially forward portion of the third wall 118 to the turbine vane 72 or the stator 63, however, it will be appreciated that the tab 128 can extend from any portion of the carriage assembly 102 and couple to any portion of the stator 63. The coupling between the tab 128 and the stator 63 can be done through any suitable method such as, but not limited to, welding, adhesion, fastening, frictional contact (e.g., confronting one another without a physical coupling), or the like. As illustrated, the carriage assembly 102 is a separate, discrete component coupled to the stator through the tab 128, however, it will be appreciated that the carriage assembly 102 can be integrally formed with the stator 63. Specifically, the carriage assembly can be integrally formed with the turbine vane 72, or any other suitable component of the stator 63, through additive manufacturing, casting, or the like such that the carriage assembly 102 and at last a portion of the stator 63 form a monolithic structure.

A retainer groove 130 can be formed within a portion of the seal seat 106, specifically the third wall 118, with a retainer 132 corresponding to the retainer groove 130. As illustrated, the retainer groove 130 can be formed on an axially downward or downstream portion of the third wall 118. It is contemplated that the retainer groove 130 and the retainer 132 can be located along a radially outer portion of the third wall that is on axially opposite from where the tab 128 extends from. The retainer 132 can be any suitable retainer such as, but not limited to, a snap ring, a cover plate, cover plate with bolts, a bayonet-retained cover plate, or the like.

It is contemplated that that the seal seat 106 can include any number of one or more walls including any of the components described herein (e.g., the flange 122). At least one of the first wall 114, the second wall 116, or the third wall 118 can be excluded from the carriage assembly 102. As a non-limiting example, the rotor seal assembly 100 can be defined as a Compressor Discharge Pressure (CDP) seal assembly. In such a case, the second wall 116 can be excluded such that the seal seat 106 is defined at least by the first wall 114 extending radially inward toward the rotor 51 at a downstream portion of the seal assembly 104, and the third wall 118 extending upstream or forward the second wall 116.

A set of tertiary seals 134 can be located between the carriage assembly 102 and the stator 63. Specifically, the set of tertiary seals 134 can be located between a radially inner portion of the stator 63 and a radially outer portion of the third wall 118. As illustrated, there can be two tertiary seals 134 arranged in series. The set of tertiary seals 134 can include any suitable seal such as, but not limited to, a piston ring, an E-seal, a W-seal, a C-seal, a leaf seal, a bellows, a braid/rope seal, a contact seal, or any combination thereof. It will be appreciated that the tertiary seals can be 360-degree seals (e.g., they can extend circumferentially about the entirely of the rotor 51), two segments 180-degree each, or more than two segments.

The seal assembly 104 can include the floating seal body 110 defined by a first seal face 136 confronting the rotor 51, a second seal face 138 confronting the second wall 116 of the carriage assembly 102, a third seal face 140 opposite the first seal face 136 and confronting at least a portion of the seal cavity 108 and/or the biasing element 112, and a fourth seal face 142 opposite the second seal face 138 and confronting the first wall 114. In other words, the first seal face 136 can define a radially inner face of the floating seal body 110, the second seal face 138 can define an axially forward or upstream face of the floating seal body 110 (e.g., the face confronting at least a portion of the leakage fluid 90), the third seal face 140 can define a radially outer face of the floating seal body, and the fourth seal face 142 can define an axially downward or downstream face of the floating seal body 110.

An internal passage 144 can fluidly couple the leakage fluid 90 upstream of the rotor seal assembly 100 to various interfaces between portions of the seal assembly 104. The internal passage 144 can be formed within the floating seal body 110 and fluidly couple an inlet 146 on the second seal face 138 to a set of outlets 148 located on a portion of the third seal face 140 and confronting at least one of the seal cavity 108 or the interior 113 of the biasing element 112. It is contemplated that at least one outlet 148 of the set of outlets 148 can be fluidly coupled to the interior 113 of the biasing element 112 and be radially opposite or otherwise oppose the head 115 of the biasing element 112.

During operation of the gas turbine engine 10, at least a portion of the leakage fluid can flow into the internal passage 144 through the inlet 146. The leakage fluid 90 can subsequently flow through the internal passage and ultimately out at least one outlet 148 of the set of outlet 148. Upon start-up of the turbine engine 10, the biasing element 112 can be in the contracted, second position (FIG. 3B). Once the working fluid 88 is generated, at least a portion of the leakage fluid 90 exiting the set of outlets 148 can be exhausted into the interior 113 of the biasing element 112 or otherwise into the interior of the seal cavity 108. This, in turn, can move the biasing element 112 from the contracted position (FIG. 3B) to the extended position (FIG. 3A). As the floating seal body 110 is coupled to the biasing element 112, the floating seal body 110, and hence the seal assembly 104, can move with the biasing element 112 between the first position (FIG. 3A) and the second position (FIG. 3B). In other words, the contraction or extension of the biasing element 112 can move the rotor seal assembly 100 between the first position, and the second position. The movement of the biasing element 112 can be dependent on the operational state of the gas turbine engine 10. For example, the leakage fluid 90 will only be present in the gas turbine engine 10 when there is a working fluid 88 or airflow (e.g., the pressurized airflow 76 or combustion gases) flowing through the gas turbine engine 10. In other words, the leakage fluid 90 will only be present when the gas turbine engine 10 is being operated. As such, at least a portion of the leakage fluid 90 will enter the interior 113 of the biasing element 112 and cause the biasing element 112 to expand or go into its expanded position. This will result in the rotor seal assembly 100 being in the first position. When the gas turbine engine 10 is not being operated, however, the pressurized working fluid and the leakage fluid 90 will not actively flow through the gas turbine engine 10. As such, there will be no leakage fluid 90 flowing into the interior 113 of the biasing element 112. This will result in the biasing element 112 going back to its biased position (e.g., the contracted position) and the rotor seal assembly 100 being in the second position. The axial, circumferential, or radial position of the floating seal body 110 can further be defined by the flange 122. For example, during operation of the gas turbine engine 10, the rotor 51 can exert an axial, a radial, or a circumferential force on the floating seal body 110 such that floating seal body 110 will want to move in the direction of the force. As the flange 122 is static and confronts, is received within, or is otherwise coupled to the seat 124, the flange 122 and the seat 124 can limit at least a portion of the circumferential, axial, or radial movement of the floating seal body 110. In other words, the flange 122 can circumferentially, axially or radially position the floating seal body 110 within the seal cavity 108 and limit or otherwise stop the floating seal body 110 from moving in at least one of the axial, radial or circumferential directions.

The leakage fluid 90 that flows into the interior 113 of the biasing element 112 can expand the biasing element 112 such that the biasing element exerts a closing force on the seal assembly 104. As used herein, the term "closing force" can refer to the radial force exerted on the seal assembly 104, specifically the floating seal body 110, by the biasing element 112 that pushes the seal assembly 104 toward the rotor 51. The closing force can be based on the location of the rotor seal assembly 100 within the gas turbine engine 10 and be based on one or more operational characteristics of the gas turbine engine 10. As used herein, the term "operational characteristics" can refer to the operational state of the gas turbine engine 10 (e.g., the gas turbine engine 10 is operational, or the gas turbine engine 10 is non-operational), or to other characteristics of the gas turbine engine 10 such as, but not limited to, a pressure differential between an upstream side and a downstream side of the portion of the stator 63 that the rotor seal assembly 100 depends from. If the pressure differential is larger (e.g., the upstream side has a higher pressure than the downstream side), then the leakage fluid 90 will be at a higher pressure within the interior 113 of the biasing element 112 than if the pressure differential were smaller. The larger the pressure within the interior 113 of the biasing element 112, or the larger the amount of leakage fluid 90 within the biasing element 112, then the greater the closing force. This, in turn, results in a closing force that scales with the differential pressure across the rotor seal assembly 100. As such, the closing force will be dependent on the pressure differential or the operational state of the gas turbine engine 10. During operation of the gas turbine engine 10, the rotor 51 can translate radially. The closing force allows for the rotor seal assembly 100 to accurately and faithfully follow the radial movement of the rotor 51 without radially, axially, or circumferentially displacing the rotor seal assembly 100 in an undesired fashion.

Figure 4:
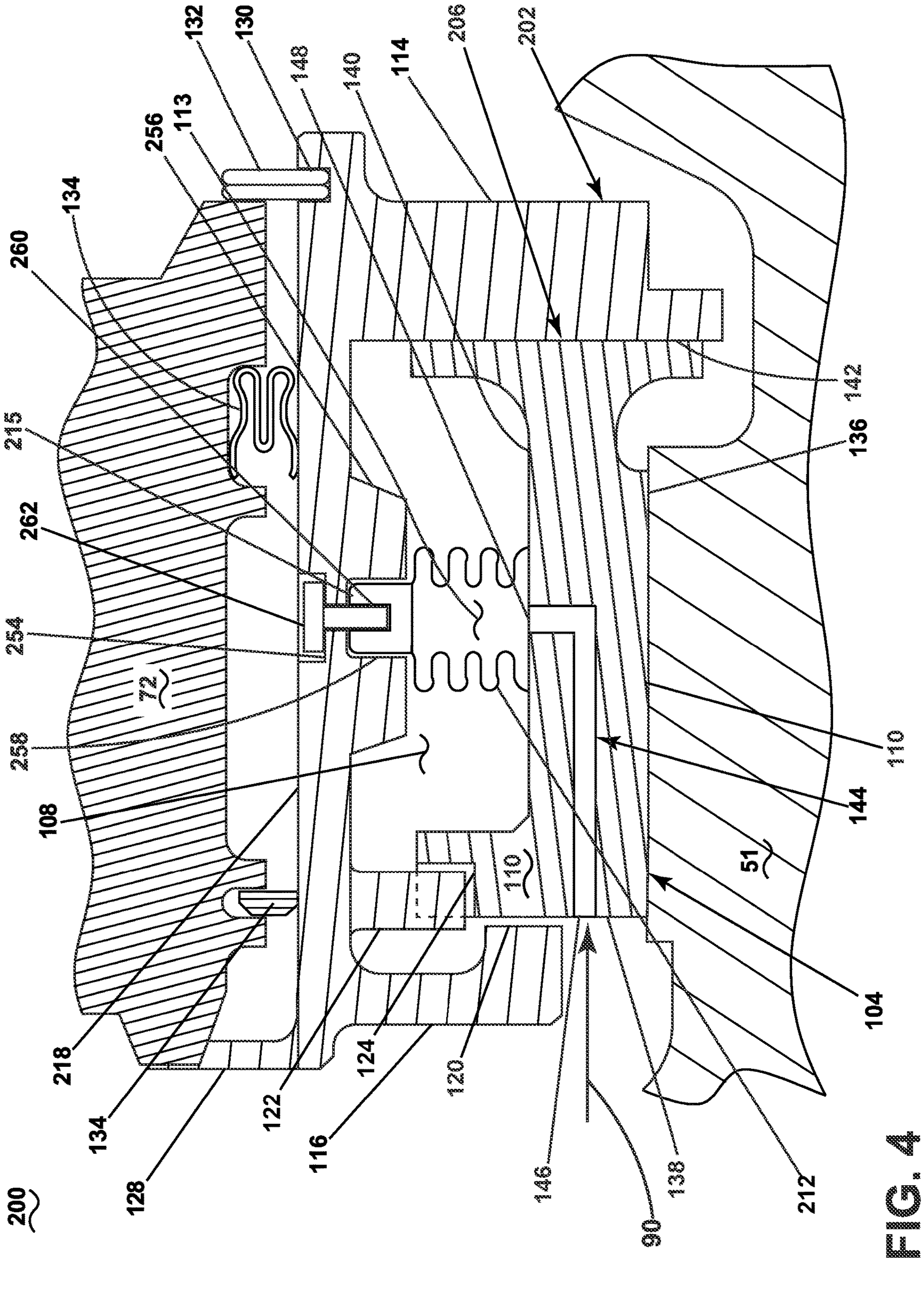
FIG. 4 is a schematic cross-sectional illustration of an exemplary rotor seal assembly of FIG. 2, further including a radial fastener coupling the biasing element to the carriage assembly.

FIG. 4 is a schematic illustration of cross-sectional view of an exemplary rotor seal assembly 200 of FIG. 2. The exemplary rotor seal assembly 200 is similar to the rotor seal assembly 100; therefore, like parts will be identified with like numerals in the 200 series, with it being understood that the description of the like parts of the rotor seal assembly 100 applies to the exemplary rotor seal assembly 200 unless otherwise noted.

The rotor seal assembly 200 can include a biasing element 212 which can include a first bore 260 extending radially through a portion of the biasing element 212. Specifically, the first bore 260 can extend through a radially distal portion of the biasing element 112 (e.g., the head 215 of the biasing element 212).

The rotor seal assembly can further include a carriage assembly 202 carried by at least a portion of the stator 63. The carriage assembly 202 can include the first wall 114, the second wall 116, and a third wall 218 interconnecting the first wall 114 and the second wall 116. The third wall 218 can include a second bore 254 extending radially through a portion of the third wall 218. Specifically, the second bore 254 can extend from a radially distal portion of the third wall 218 and through at least a portion of the third wall 218. As illustrated, the second bore 254 can include a radially upper portion and a radially inner portion with the radially upper portion having a larger diameter than the radially inner portion. As such, the second bore 254 can be defined by a step such that the bore decreases in cross sectional area from the radially outer portion of the bore to a radially inner portion of the bore. Alternatively, the second bore 254 can be defined by a constant cross-sectional area.

The third wall 218 can further include a protrusion 256 extending radially inwardly from a radially inner portion of the third wall 218 confronting the seal cavity 108. The protrusion 256, as illustrated, can include a seat 258 corresponding to the head 215 of the biasing element 212.

The biasing element 212 can be axially located such that the head 215 of the biasing element 212 corresponds to the seat 258 of the third wall 218. As such, the first bore 260 can correspond to the second bore 254, specifically the radially inner portion of the second bore 254. A fastener 262 can extend through the second bore 254 and at least a portion of the first bore 260 to operatively couple the biasing element 212 to the carriage assembly 202. It is contemplated that the fastener 262 and the seat 258 can limit at least one of an axial movement, a circumferential movement, or a radial movement of the biasing element 212. The fastener 262 can be any suitable fastener such as, but not limited to, a screw, a tab, a pin, a weld, a bolt and nut with the bolt being integrally formed with the top of the biasing element 212, a retaining snap ring, or any combination thereof.

Figure 5:
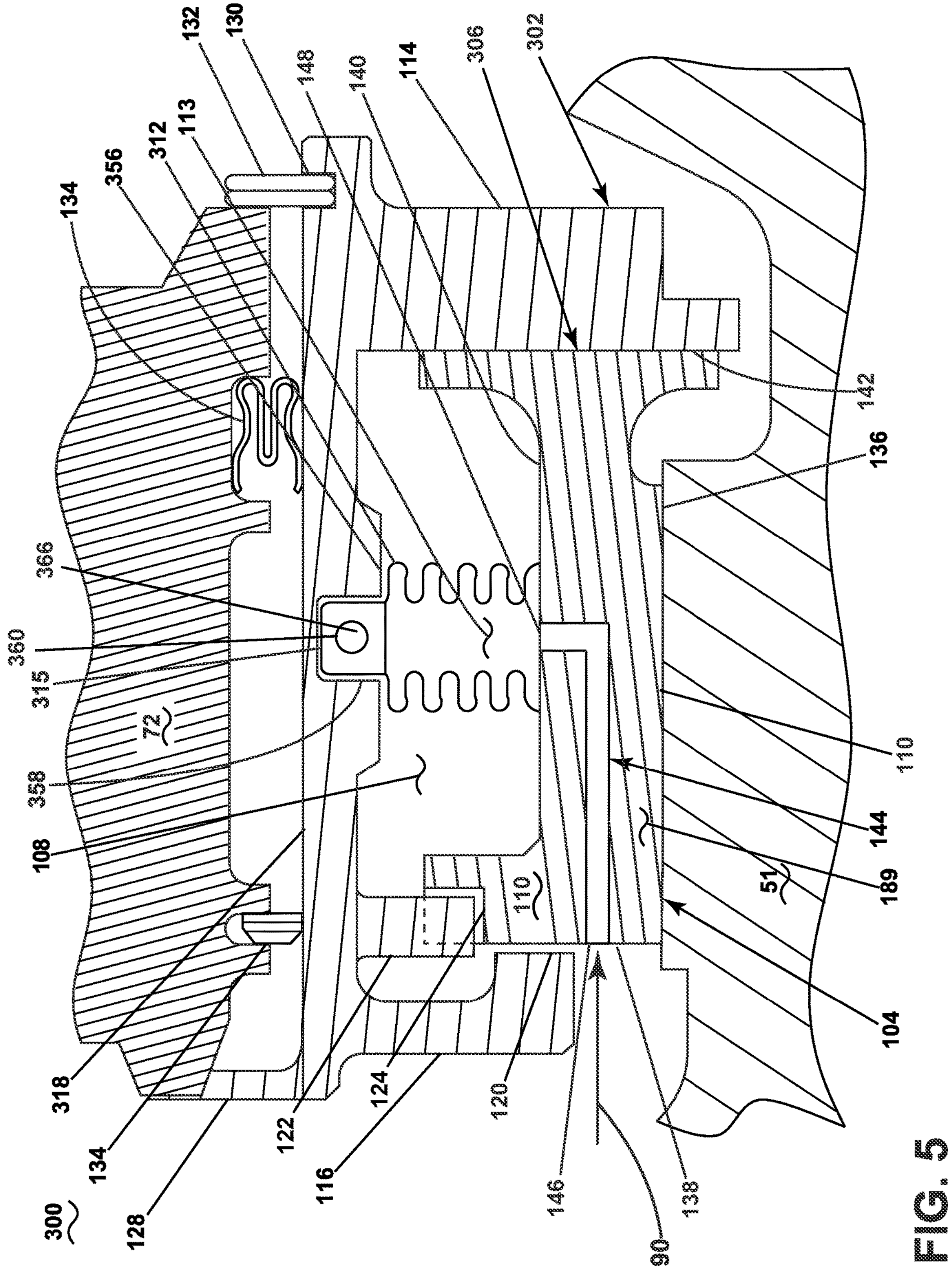
FIG. 5 is a schematic cross-sectional illustration of an exemplary rotor seal assembly of FIG. 2, further including a circumferential pin coupling the biasing element to the carriage assembly.

FIG. 5 is a schematic illustration of a cross-sectional view of an exemplary rotor seal assembly 300 of FIG. 2. The exemplary rotor seal assembly 300 is similar to the rotor seal assembly 100, 200; therefore, like parts will be identified with like numerals in the 300 series, with it being understood that the description of the like parts of the rotor seal assembly 100, 200 applies to the exemplary rotor seal assembly 300 unless otherwise noted.

The rotor seal assembly 300 can include a carriage assembly 302 carried by at least a portion of the stator 63. The carriage assembly 302 can include the first wall 114, the second wall 116, and a third wall 318 interconnecting the first wall 114 and the second wall 116. The third wall 318 can include a protrusion 356 extending radially inwardly from a radially inner portion of the third wall 318 confronting the seal cavity 108. The protrusion 356, as illustrated, can include a seat 358 extending radially through at least a portion of the protrusion 356 and into at least a portion of the third wall 318.

A biasing element 312 can include a head 315 that corresponds to and fits within the seat 358. The biasing element 312 can further include a first bore 360 extending in circumferentially. A pin 366, corresponding to the first bore 360, can extend circumferentially through at least a portion of the biasing element 312, specifically the head 315 of the biasing element 312. The pin 366 and the seat 358 can limit at least one of a circumferential movement, an axial movement, or a radial movement of the biasing element 312.

Figure 6:
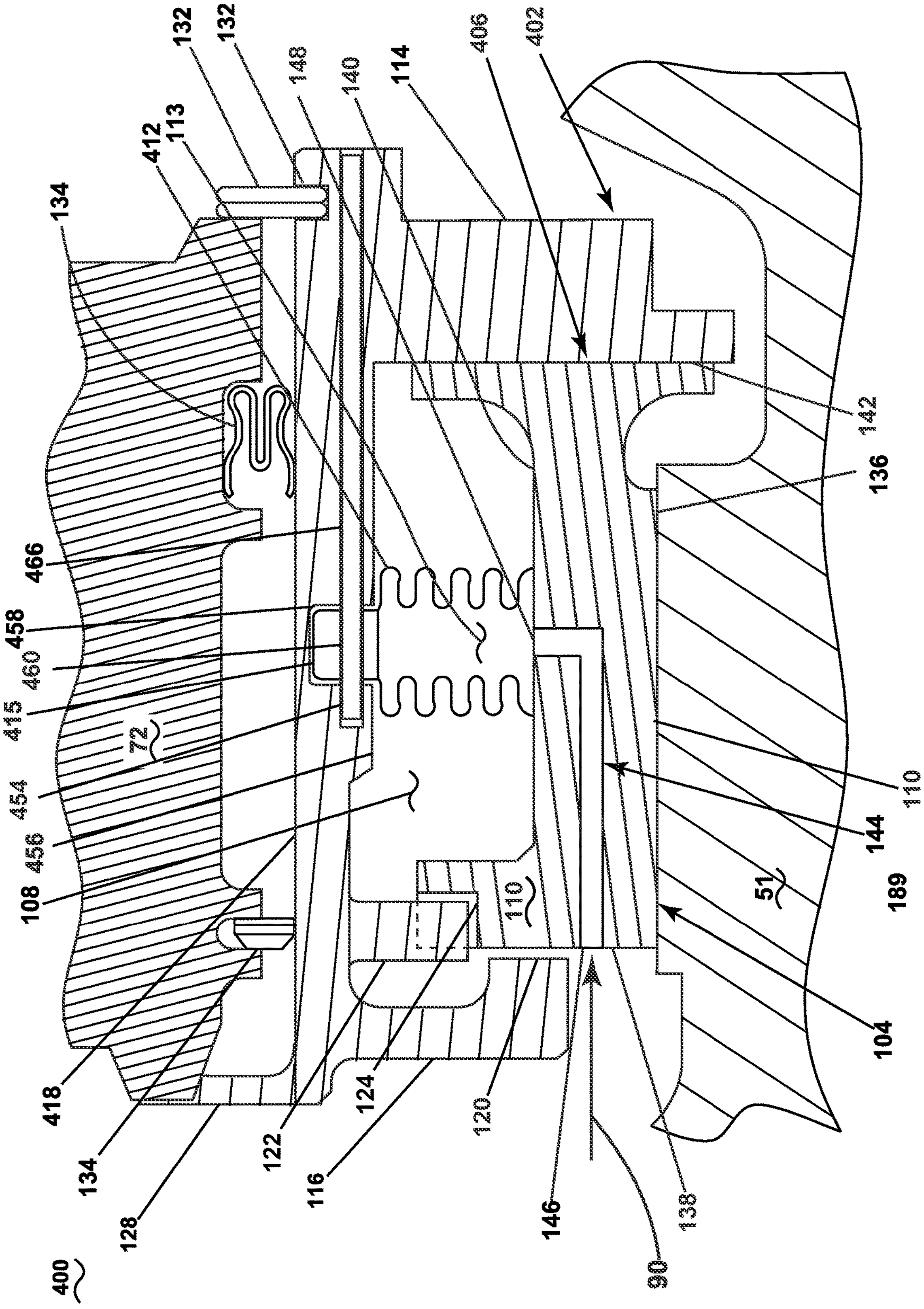
FIG. 6 is a schematic cross-sectional illustration of an exemplary rotor seal assembly of FIG. 2, further including a pin extending axially and coupling the biasing element to the carriage assembly.

FIG. 6 is a schematic illustration of a cross-sectional view of an exemplary rotor seal assembly 400 of FIG. 2. The exemplary rotor seal assembly 400 is similar to the rotor seal assembly 100, 200, 300; therefore, like parts will be identified with like numerals in the 400 series, with it being understood that the description of the like parts of the rotor seal assembly 100, 200, 300 applies to the exemplary rotor seal assembly 400 unless otherwise noted.

The rotor seal assembly 400 can include a biasing element 412, which can include a head 415. The biasing element 412, specifically the head 415, can include a first bore 260 extending axially through the head 415 of the biasing element 412.

The rotor seal assembly 400 can include a carriage assembly 402 carried by at least a portion of the stator 63. The carriage assembly 402 can include the first wall 114, the second wall 116, and a third wall 418 interconnecting the first wall 114 and the second wall 116. The third wall 418 can include a protrusion 456 extending radially inwardly from a radially inner portion of the third wall 418 confronting the seal cavity 108. The protrusion 456, as illustrated, can include a seat 358 extending radially through at least a portion of the protrusion 456 and into at least a portion of the third wall 418. The protrusion 456 can extend along an entire downstream half and at least a portion of an upstream half of the third wall 418 and include a second bore 254 extending axially within at least a portion of the protrusion 456 or the third wall 418. As illustrated, the second bore 254 can have a constant cross-sectional area and be non-continuous in the axial direction.

The head 415 can fit within the seat 458 such that the first bore 460 corresponds to the second bore 454 such that a pin 466 can extend axially through the first bore 260 and at least a portion of the second bore 254 so as to couple the biasing element 412 to the carriage assembly 402. The pin 466 and the seat 458 can couple the biasing element 412 to the carriage assembly 402 and limit at least one of an axial movement, a radial movement, or circumferential movement or an axial movement of the biasing element 412.

Figure 7:
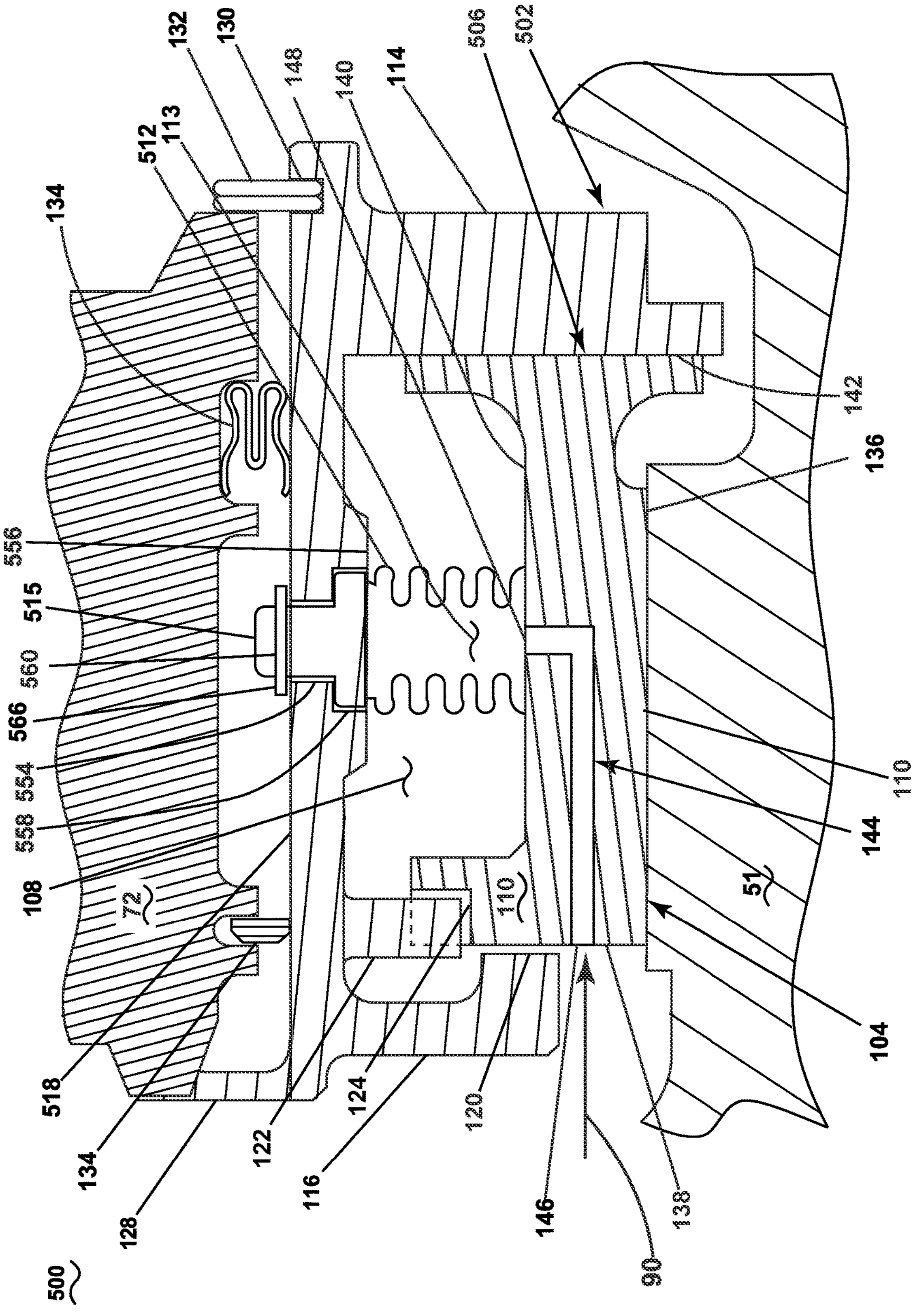
FIG. 7 is a schematic cross-sectional illustration of an exemplary rotor seal assembly of FIG. 2, further including an exemplary pin extending axially and coupling the biasing element to the carriage assembly.

FIG. 7 is a schematic illustration of a cross-sectional view of an exemplary rotor seal assembly 500 of FIG. 2. The exemplary rotor seal assembly 500 is similar to the rotor seal assembly 100, 200, 300, 400; therefore, like parts will be identified with like numerals in the 500 series, with it being understood that the description of the like parts of the rotor seal assembly 100, 200, 300, 400 applies to the exemplary rotor seal assembly 500 unless otherwise noted.

The rotor seal assembly 500 can including a biasing element 512 can include a head 515 including a first bore 460 extending axially through the head 515. The rotor seal assembly 500 can further include a carriage assembly 502 carried by at least a portion of the stator 63. The carriage assembly 502 can include the first wall 114, the second wall 116, and a third wall 520 interconnecting the first wall 114 and the second wall 116. The third wall 520 can include a second bore 554 extending radially through a portion of the third wall 518, specifically a radially outer portion of the third wall 518. The third wall 520 can further include a protrusion 556 extending radially inwardly from a radially inner portion of the third wall 520 confronting the seal cavity 108. The protrusion 556 can include a seat 558 extending radially through at least a portion of the protrusion 556 and corresponding to the second bore 554 of the third wall 520.

As illustrated, the head 515 can be sized with varying diameters to fit through both the seat 558 and the second bore 554. The head 515 can extend radially past the third wall 520. A pin 566 can extend axially through the first bore 560 of the biasing element 512. The seat 558, the second bore 554, and the pin 566 can couple the biasing element 512 to the carriage assembly 502 and limit at least one of an axial movement, a radial movement, or a circumneutral movement of the biasing element 512.

Figure 8:
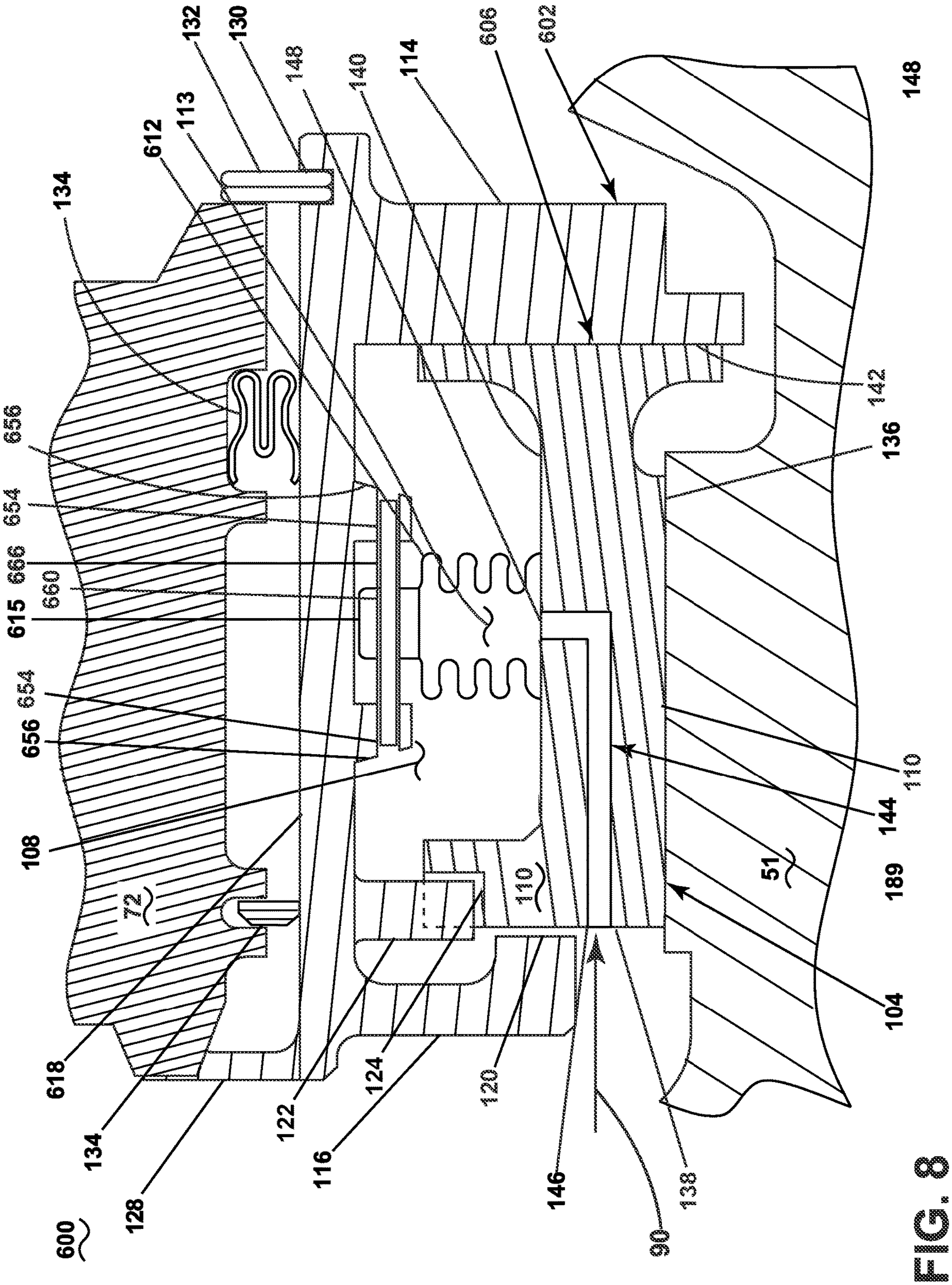
FIG. 8 is a schematic cross-sectional illustration of an exemplary rotor seal assembly of FIG. 2, further an exemplary pin extending axially coupling the biasing element to the carriage assembly.

FIG. 8 is a schematic illustration of a cross-sectional view of an exemplary rotor seal assembly 600 of FIG. 2. The exemplary rotor seal assembly 600 is similar to the rotor seal assembly 100, 200, 300, 400, 500; therefore, like parts will be identified with like numerals in the 600 series, with it being understood that the description of the like parts of the rotor seal assembly 100, 200, 300, 400, 500 applies to the exemplary rotor seal assembly 600 unless otherwise noted.

The rotor seal assembly 600 can include biasing element 612, which can include a head 615 confronting the carriage assembly 602. The head 615 can include a first bore 660 extending axially through the head 615

The rotor seal assembly 600 can further include a carriage assembly 602 carried by at least a portion of the stator 63. The carriage assembly 602 can include the first wall 114, the second wall 116, and a third wall 618 interconnecting the first wall 114 and the second wall 116. The third wall 618 can include a set of protrusions 656 extending radially inwardly from radially inner portions of the third wall 618 confronting the seal cavity 108. Specifically, two protrusions 656 can extend from separate radially inner portions of the third wall 618. The set of protrusions 656, as illustrated, can each include a second bore 654 extending radially through at least a portion of the corresponding protrusions 656.

The biasing element 612 can be positioned such that the head 615 is positioned axially between the set of protrusions 656. Specifically, the biasing element 612 can be positioned such that the first bore 660 of the head 615 corresponds to the second bore 654 of the protrusions 656. A pin 666 can extend axially through the first bore 660 and the second bore 654 such that the pin 666 can couple the biasing element 612 to the carriage assembly 602 and limit at least one of an axial movement, a radial movement, or a circumneutral movement of the biasing element 612.

Figure 9:
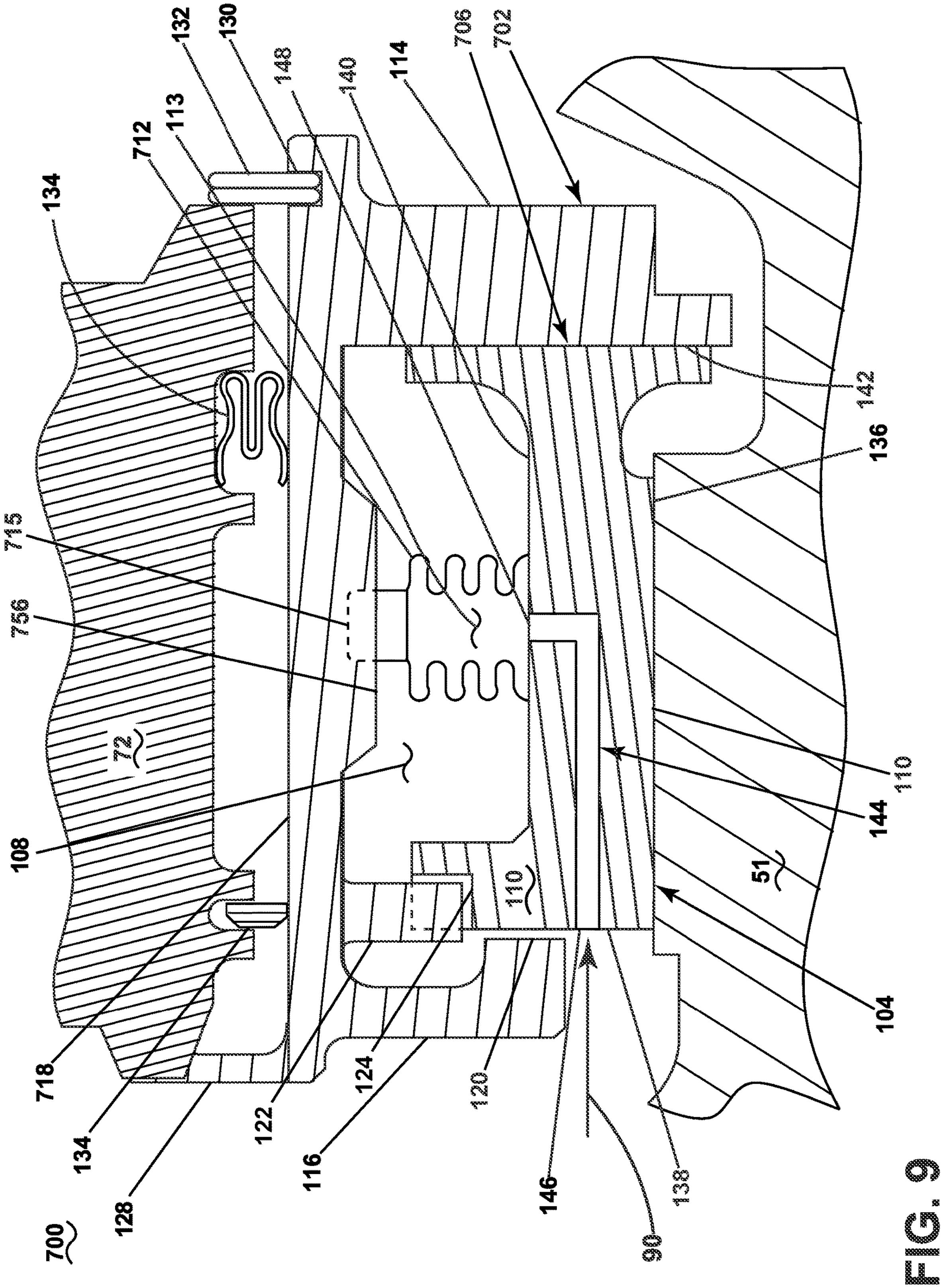
FIG. 9 is a schematic cross-sectional illustration of an exemplary rotor seal assembly of FIG. 2, further including a biasing element integrally formed with the carriage assembly.

FIG. 9 is a schematic illustration of a cross-sectional view of an exemplary rotor seal assembly 700 of FIG. 2. The exemplary rotor seal assembly 700 is similar to the rotor seal assembly 100, 200, 300, 400, 500, 600; therefore, like parts will be identified with like numerals in the 700 series, with it being understood that the description of the like parts of the rotor seal assembly 100, 200, 300, 400, 500, 600 applies to the exemplary rotor seal assembly 700 unless otherwise noted.

The rotor seal assembly 700 can include a carriage assembly 702 carried by at least a portion of the stator 63. The carriage assembly 702 can include the first wall 114, the second wall 116, and a third wall 718 interconnecting the first wall 114 and the second wall 116. The third wall 718 can include a protrusion 756 extending radially inwardly from radially inner portions of the third wall 718 confronting the seal cavity 108.

A biasing element 712 can include a head 715 confronting the carriage assembly 702, with the head 715 being integrally formed with at least a portion of the carriage assembly 702. Specifically, the head 715 can be integrally formed within a portion of the protrusion 756 in order to couple the biasing element 712 to the carriage assembly 702. It is contemplated that biasing element 712, or the head 715 of the biasing element 712, can be integrally formed with the protrusion 756 through any suitable method such as, but no limited to, additive manufacturing or casting, or otherwise be coupled to the protrusion 756 through any suitable method such as, but not limited to, welding, adhesion or the like. The protrusion 756 can couple the biasing element 712 to the carriage assembly 602 and limit at least one of an axial movement, a radial movement, or a circumneutral movement of the biasing element 612.

Figure 10:
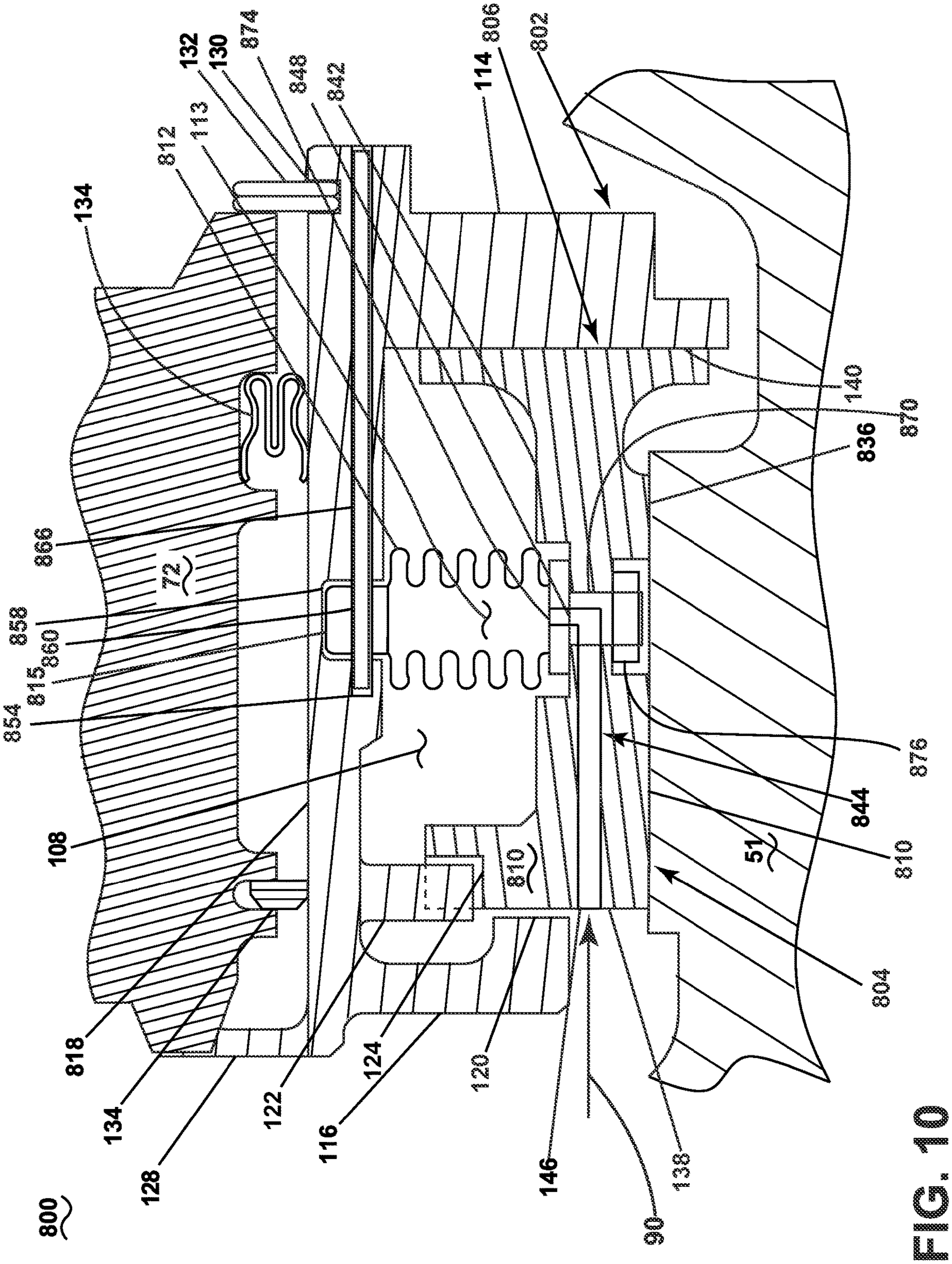
FIG. 10 is a schematic cross-sectional illustration of an exemplary rotor seal assembly of FIG. 2, further including an exemplary pin axially extending and coupling the biasing element to the carriage assembly, and further including a fastener securing the biasing element to the seal assembly.

FIG. 10 is a schematic illustration of a cross-sectional view of an exemplary rotor seal assembly 800 of FIG. 2. The exemplary rotor seal assembly 800 is similar to the rotor seal assembly 100, 200, 300, 400, 500, 600, 700; therefore, like parts will be identified with like numerals in the 800 series, with it being understood that the description of the like parts of the rotor seal assembly 100, 200, 300, 400, 500, 600, 700 applies to the exemplary rotor seal assembly 800 unless otherwise noted.

The rotor seal assembly 800 can include a carriage assembly 802, a rotor seal assembly 804, and a biasing element 812 provided therebetween. The biasing element 812 can include a head 815 confronting the carriage assembly 802. The head 815 can include a first bore 860 extending axially through the head 815.

The carriage assembly 802 can be carried by at least a portion of the stator 63, and include the first wall 114, the second wall 116, and a third wall 818 interconnecting the first wall 114 and the second wall 116. The third wall 818 can include a protrusion 856 extending radially inwardly from radially inner portions of the third wall 818 confronting the seal cavity 108. The protrusion 856, as illustrated, can include a second bore 854 extending radially through at least a portion of the protrusion 856 and into at least a portion of the third wall 818. The protrusion 856 can further include a seat 858 extending radially through at least a portion of the protrusion 856 or the third wall 818.

The seal assembly 804 can be at least partially located within the seal cavity 108, and include a floating seal body 810 defined by a first seal face 836, the second seal face 138, the third seal face 140, and a fourth seal face 842. A third bore 870 can extend radially through at least a portion of the seal body 810 from the first seal face 836 to the fourth seal face 842

The biasing element 812 can be axially positioned to overlay the third bore 870 and have the head 815 correspond to and fit within the seat 858 such that the first bore 860 corresponds to the second bore 854. A pin 866 can extend axially through at least a portion of the first bore 860 and the second bore 854 so as to couple the biasing element 812 to the carriage assembly 402. A fastener 876 can extend radially through the third bore 870 of the seal assembly 804 and couple the biasing element 812 to the floating seal body 810. As illustrated, the fastener 876 can be a screw and nut assembly, however, can be any other suitable fastener such as, but not limited to, a screw, a tab, a pin, a weld, a dovetail, or the like. The pin 866 and the seat 858 can couple the biasing element 812 to the carriage assembly 802, while the fastener 876 can couple to the biasing element 812 to the seal assembly 804. The pin 866, the seat 858, and the fastener 876 and limit at least one of an axial movement, a radial movement, or circumferential movement or an axial movement of the biasing element 812.

An internal passage 844 can be formed within at least a portion of the floating seal body 810 and the fastener 876. The internal passage 844 can fluidly couple the inlet 146 on the third seal face 140 to at least an outlet 848 provided along a portion of the fastener 876 exposed to the interior 113 of the biasing element 812. As such, the internal passage 844 can be formed within the floating seal body 810 and the fastener 876 and fluidly couple the interior 113 to the inlet 146.

Figure 11:
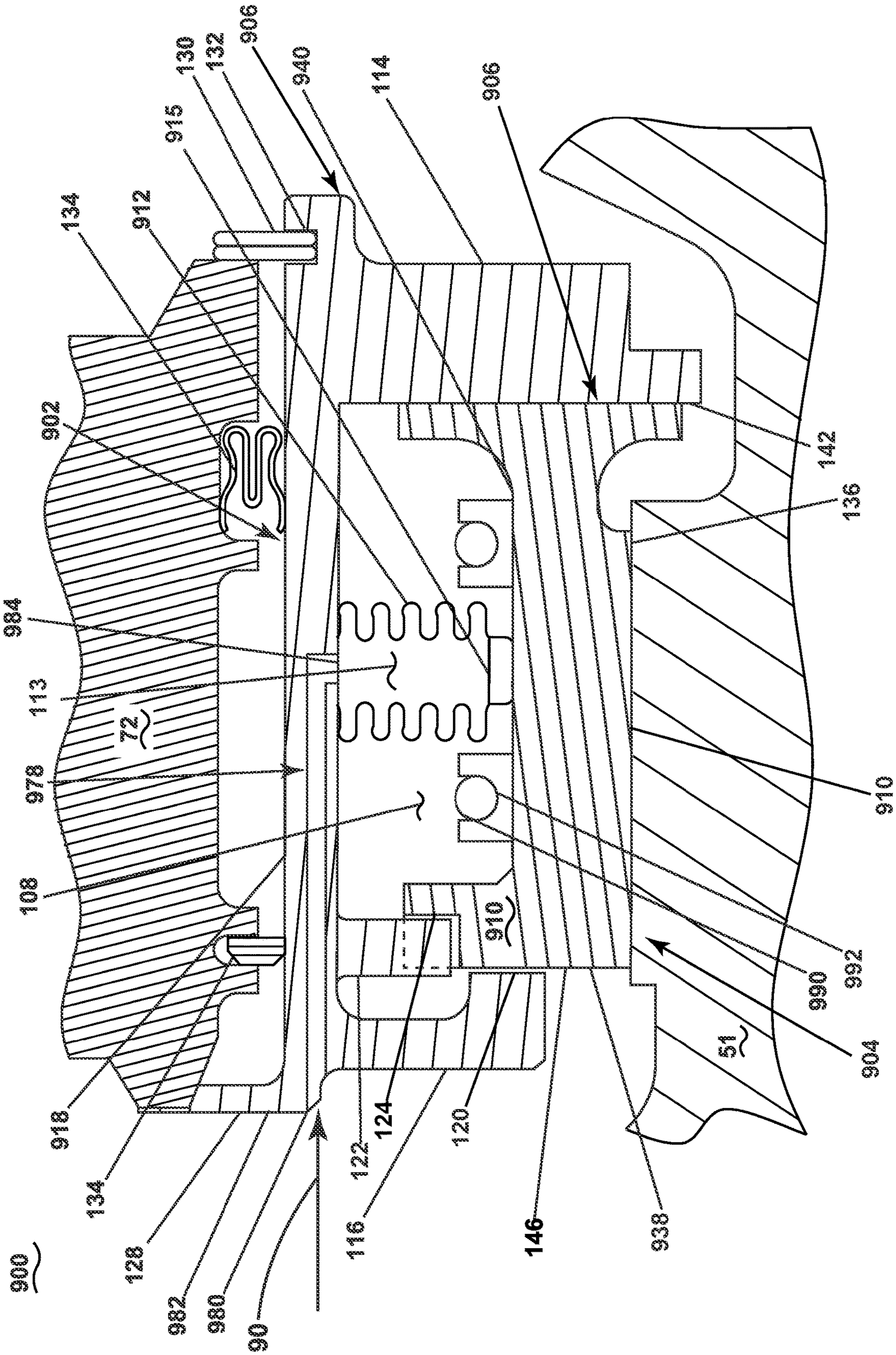
FIG. 11 is a schematic cross-sectional illustration of an exemplary rotor seal assembly of FIG. 2, further including a carriage assembly including an internal passage fluidly coupled to the interior of the biasing element.

FIG. 11 is a schematic illustration of a cross-sectional view of an exemplary rotor seal assembly 900 of FIG. 2. The exemplary rotor seal assembly 900 is similar to the rotor seal assembly 100, 200, 300, 400, 500, 600, 700, 800; therefore, like parts will be identified with like numerals in the 900 series, with it being understood that the description of the like parts of the rotor seal assembly 100, 200, 300, 400, 500, 600, 700, 800 applies to the exemplary rotor seal assembly 900 unless otherwise noted.

The rotor seal assembly 900 can include a carriage assembly 902 carried by at least a portion of the stator 63. The carriage assembly 902 can include the first wall 114, the second wall 116, and a third wall 918 interconnecting the first wall 114 and the second wall 116. An internal passage 978 can be formed within the third wall 918 of the carriage assembly 902 and fluidly couple an inlet 980 formed on an upstream face 982 of the third wall 918 to an outlet 984 located on a radially inner face 986, confronting the seal cavity 108, of the third wall 918.

The rotor seal assembly 900 can further include a seal assembly 904 at least partially located within the seal cavity 108, and including a floating seal body 910 defined by the first seal face 136, a second seal face 938 similar to the first seal face 136 but without the inlet 146, the third seal face 140, and a fourth seal face 942. A biasing element 912 can include a head 915 confronting the seal assembly 804, specifically the fourth seal face 942. The interior 113 of the biasing element 912 can corresponding to the outlet 984 such that the interior 113 is fluidly coupled to the inlet 980 through the internal passage 978. The biasing element can be coupled to at least one of the carriage assembly 902 or the seal assembly 904 through any suitable coupling method such as, but not limited to, welding, adhesion, fastening, or the like.

Additional biasing elements 912, illustrated as a set of garter springs 990, can extend circumferentially about or otherwise coil around the entirety of a floating seal body 910, or alternatively across one or more segments of a set of floating seal bodies 910. The set of garter springs 990 can urge the floating seal body 910 toward the rotor 51 similar to how the biasing element 912 urges the floating seal body 910 toward the rotor 51. Thus, the set of garter springs 990 and the biasing element 912 can together be used or otherwise be defined as the biasing element configured to provide the closing force. The set of garter springs 990 can interface with the floating seal body 910 by a corresponding groove or channel 992. The channel 992 can be formed within a protrusion extending from the fourth seal face 942 as illustrated. Additionally, or alternatively, the channel 992 can be extend into the third seal face 940 such that at least a portion of the set of garter springs 990 extend into the floating seal body 910.

The set of garter springs 990 can be used in cases where the rotor seal assembly 900 is provided within a portion of the gas turbine engine 10 with a high-pressure differential. As such, the set of garter springs 990 can provide an additional closing force to the closing force generated by the biasing element 912 to ensure that the overall closing force is sufficient based on the pressure differential.

Figure 12:
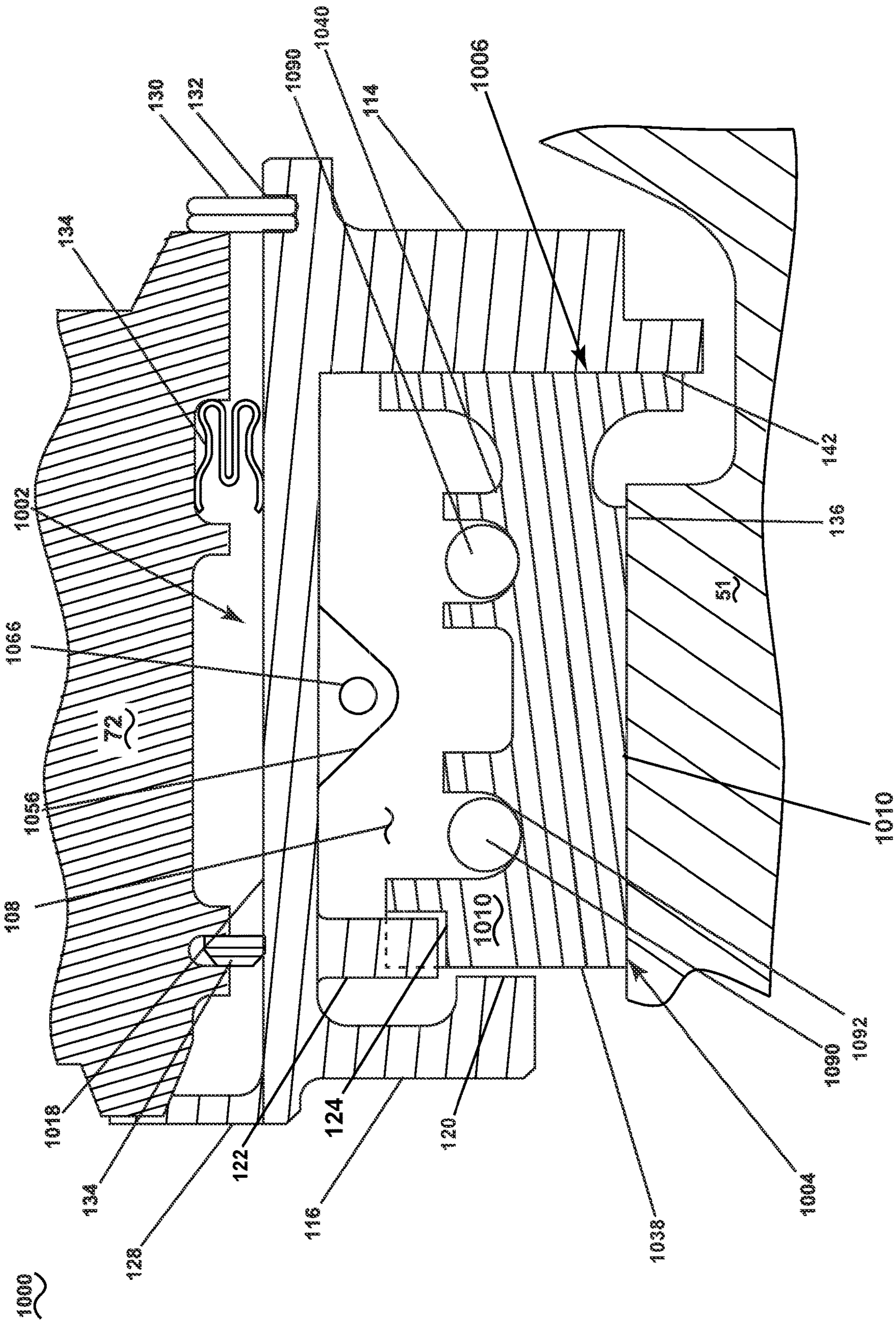
FIG. 12 is a schematic cross-sectional illustration of an exemplary rotor seal assembly of FIG. 2, further including a protrusion extending from the carriage assembly.

FIG. 12 is a schematic illustration of a cross-sectional view of an exemplary rotor seal assembly 1000 of FIG. 2. The exemplary rotor seal assembly 1000 is similar to the rotor seal assembly 100, 200, 300, 400, 500, 600, 700, 800, 900; therefore, like parts will be identified with like numerals in the 1000 series, with it being understood that the description of the like parts of the rotor seal assembly 100, 200, 300, 400, 500, 600, 700, 800, 900 applies to the exemplary rotor seal assembly 1000 unless otherwise noted. The rotor seal assembly 1000 is similar to the rotor seal assembly 100, 200, 300, 400, 500, 600, 700, 800, 900, except that the rotor seal assembly 1000 does not include a biasing element like the rotor seal assembly 100, 200, 300, 400, 500, 600, 700, 800, 900 does.

The rotor seal assembly 1000 can include a carriage assembly 1002 carried by at least a portion of the stator 63. The carriage assembly 1002 can include the first wall 114, the second wall 116, and a third wall 1018 interconnecting the first wall 114 and the second wall 116. The third wall 1018 can include a protrusion 1056 extending radially inwardly from a radially inner portion of the third wall 1018 and confronting the seal cavity 108. A pin 1066 can extend circumferentially through the protrusion 1056. It is contemplated that the pin 1066 can be used in cases where the rotor seal assembly 1000 is defined as a segmented rotor seal assembly 100 (e.g., at least a portion of the rotor seal assembly 1000 is circumferentially non-continuous about the rotor 51). The pin 1066 can act as a method to physically couple one segment of the carriage assembly 1002 (or any other portion of the rotor seal assembly 1000) to a corresponding adjacent carriage assembly 1002. It will be appreciated that the pin 1066 extending through the protrusion 1056 can be any suitable component to couple one segment to another such as, but not limited, a bolt, a pin, a fastener, or the like.

The rotor seal assembly 1000 can further include a seal assembly 1004 at least partially located within the seal cavity 108, and including a floating seal body 1010 defined by the first seal face 136, a second seal face 1038 similar to the first seal face 136 but without the inlet 146, a third seal face 1040, and the fourth seal face 142. A pair of biasing elements illustrated as a set of garter springs 1090, can be received within a set of circumferential channels 1092 formed within a portion of the seal assembly 1004. As a non-limiting example, the set of garter springs 1090 can be received within the set of circumferential channels 1092 formed within a portion of the third seal face 1040. As illustrated, the floating seal body 1010 does not include an internal passage.

Benefits of the present disclosure include the rotor seal assembly with an increased sealing capability, without an increased manufacturing burden, when compared to conventional rotor seal assemblies. For example, conventional rotor seal assemblies can rely on creating a labyrinth between the stator and the rotor by extending components from the rotor (e.g., teeth that extend from the rotor). The space between the components from the rotor and the stator ultimately determine the effectiveness of the rotor seal assembly from limiting or preventing the leakage fluid from passing through the rotor-stator gap. This space is only scalable by locating the stationary components of the rotor seal assembly closer to the components extending from the rotor. This ultimately results in an increased manufacturing burden as each rotor seal assembly needs to be tuned, designed, or otherwise separately manufactured depending on its location within the turbine engine. Conventional labyrinth seals also have limited capability for leakage control based on seal diameter, vibratory response, and other factors. A labyrinth seal tooth to stator (usually honeycomb abradable) sealing gap or clearance can only be held so tight in a gas turbine engines operation, generally to a physical gap of 4 to 100 mils, depending on the seal size and location.

The rotor seal assembly as described herein, however, specifically the floating seal body, that can be radially translated, through the biasing element, with respect to the rotor based on the operational characteristics of the turbine engine. Specifically, the biasing element can move between the contracted and expanded position based on the operational state of the turbine engine, thus radially moving the seal assembly with respect to the rotor based on the operational state of the turbine engine. For example, when the turbine engine is operational, the leakage fluid will enter the interior of the biasing element and move from the contracted to expanded position, resulting in the biasing element exerting the closing force on the seal assembly, and vice-versa for when the turbine engine is non-operational. As the sealing assembly is not in contact with the rotor when the turbine engine starts up, shuts down, or is non-operational the total time that the sealing assembly is in contact with the rotor is reduced when compared to conventional rotor seal assemblies, which decreases the total wear on the rotor seal assembly, which ultimately increases the total lifespan of the rotor seal assembly. Further, as discussed herein, the closing force scaled based on the location of the rotor seal assembly within the turbine engine as the closing force is based on the pressure differential between the upstream side and the downstream side of the portion of the stator that the carriage assembly of the rotor seal assembly depends from. As the rotor seal assembly is scalable based on its location throughout the turbine engine, there is less of a manufacturing burden as a rotor seal assembly does not need to be tuned, designed, or otherwise separately manufactured based on its location within the turbine engine. The rotor seal assembly can be used throughout the entirety of the turbine engine.

Yet another benefit of the present disclosure includes a rotor seal assembly that is dynamic based on the operational state of the turbine engine when compared to traditional turbine engines including traditional rotor seal assemblies. For example, during operation of traditional turbine engines, a film of fluid can be formed between a portion of the rotor seal assembly and the rotor. A radial opening force, dependent on the pressure differential of where the traditional rotor seal assembly is located, can be formed by the film of fluid that pushes or otherwise displaces the rotor seal assembly radially away or outward from the rotor. Further, during operation of the turbine engine, the rotor can translate radially and it is important the rotor seal assembly accurately follow the radial translation of the rotor (e.g., the rotor seal assembly should not become axially or circumferentially displaced based on the radial movement of the rotor). The film of fluid generated by the traditional rotor seal assemblies can cause the traditional rotor seal assembly to translate axially, circumferentially, or radially in an undesired fashion, ultimately reducing the sealing effectiveness of the traditional rotor seal assembly. The rotor seal assembly as described herein, however, counteracts the radial opening force with the closing force, specifically a radially closing force, generated through the biasing element. As discussed herein, the closing force, similar to the radial opening force, is dependent on the pressure-differential. As the biasing element allows for the closing force to scale to the pressure differential, that means the closing force can be scaled to counteract the radial opening force. This, in turn, ensures that the seal assembly does not get displaced too far radially from the rotor, thus ensuring a reduced film stiffness when compared to the traditional rotor seal assembly and that the floating seal body can faithfully or accurately track the radial motion of the rotor. Additionally, the pressurized biasing element allows for a method for increasing the closing force. This allows for a dynamic force/moment balance of the floating seal body. This ensures that the rotor seal assembly as described herein allows for an increase sealing effectiveness, when compared to traditional rotor seal assemblies, which ultimately increases the overall efficiency of the turbine engine.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A turbine engine comprising an engine core comprising at least a compressor section, a combustor section, and a turbine section in axial flow arrangement defining an axial direction and an engine centerline, and defining a rotor and a stator, a carriage assembly carried by the stator and having a seal seat defining a seal cavity, and a seal assembly having a floating seal body, at least partially located within the seal cavity and having a first seal face confronting the rotor, and a biasing element located within the seal cavity and biasing the floating seal body such that the first seal face is biased toward the rotor.

The turbine engine of any preceding clause, further comprising an internal passage located within the floating seal body coupling an inlet located on a second seal face of the floating seal body to an outlet located on a third seal face of the floating seal body, with the second seal face being upstream the third seal face, and the third seal face being opposite the first seal face.

The turbine engine of any preceding clause, wherein the biasing element includes a hollow interior, and the outlet are fluidly coupled to the hollow interior.

The turbine engine of any preceding clause, wherein the biasing element is a pneumatic bellows.

The turbine engine of any preceding clause, wherein the seal seat further comprises a first wall extending radially inwardly from the stator, a second wall extending radially inwardly from the stator and upstream of the first wall, and a third wall interconnecting the first wall and the second wall wherein the first wall, the second wall, and the third wall at least partially define the seal cavity and envelope the floating seal body.

The turbine engine of any preceding clause, further comprising a protrusion extending radially inwardly from the third wall with respect to the engine centerline, and a pin extending circumferentially through at least a portion of the protrusion.

The turbine engine of any preceding clause, further comprising a flange extending at least one of axially or radially inwardly from the second wall or the third wall, respectively, and into the seal cavity, and a seat extending from the floating seal body and into the seal cavity wherein the flange confronts the seat to limit at least one of an axial or circumferential movement of the floating seal body with respect to the engine centerline.

The turbine engine of any preceding clause, further comprising an internal passage formed in one of either the carriage assembly or the floating seal body, and fluidly coupling an inlet provided on an upstream face of the carriage assembly or the floating seal body with an outlet fluidly coupled to an interior of the biasing element.

The turbine engine of any preceding clause, wherein the biasing element further comprises a head located on a radially opposite end of the biasing element with respect to the outlet.

The turbine engine of any preceding clause, wherein the head is integrally formed with at least a portion of the carriage assembly.

The turbine engine of any preceding clause, wherein the head includes a first bore extending either axially, radially, or circumferentially through the head.

The turbine engine of any preceding clause, wherein a pin extends through the first bore.

The turbine engine of any preceding clause, further comprising a second bore, corresponding to the first bore, extending through at least a portion of the carriage assembly, and wherein the pin extends through at least a portion of the second bore.

The turbine engine of any preceding clause, further comprising a third bore extending radially through at least a portion of the floating seal body, a fastener extending through the third bore and coupled to a portion of the biasing element radially opposite the head, and an internal passage formed within a portion of the floating seal body and the fastener and fluidly coupling an inlet located on an upstream face of the floating seal body to at least one outlet located along a portion of the fastener confronting the biasing element, with the outlet being fluidly coupled to an interior of the biasing element.

The turbine engine of any preceding clause, further comprising a second bore, corresponding to the first bore, extending through at least a portion of the carriage assembly, wherein the first bore and the second bore each extend radially and a fastener extends through at least a portion of the first bore and the second bore.

The turbine engine of any preceding clause, wherein the carriage assembly further comprises a retainer guide extending into a portion of the seal seat and shaped to receive a retainer, a tab extending from the seal seat, and coupled to at least a portion of the stator, a flange extending from the seal seat, and confronting a corresponding portion of the floating seal body, and a set of tertiary seals provided between a radially outer portion of the carriage assembly and a radially inner portion of the stator, wherein the tab, the retainer, and the flange limit at least one of an axial or a circumferential movement of the carriage assembly.

The turbine engine of any preceding clause, wherein the seal assembly further comprises a set of additional biasing elements extending circumferentially along a portion of the floating seal body.

The turbine engine of any preceding clause, wherein the carriage assembly is integrally formed with the stator.

The turbine engine of any preceding clause, wherein the carriage assembly and the seal assembly are located within the turbine section.

What is claimed is:

1. A turbine engine comprising:

a core casing;

a stator extending from the core casing;

a rotor rotatable about a rotational axis; and a seal assembly comprising:

- a carriage assembly carried by the stator and being radially spaced from the core casing, with respect to the rotational axis, the carriage assembly having a seal seat defining a seal cavity;
- a plurality of segments coupled to one another, the carriage assembly having a tab extending between the stator and the carriage assembly, the tab coupling the carriage assembly to the stator;
- a seal body provided within the seal cavity and having a first seal face confronting the rotor and a second seal face, opposite the first seal face, confronting the seal cavity; and
- a biasing element provided within the seal cavity and biasing the seal body radially against the rotor.

2. The turbine engine of claim 1, wherein the plurality of segments are circumferentially spaced about the rotational axis.

3. The turbine engine of claim 1, wherein the seal assembly further comprises a pin extending through a respective portion of the carriage assembly.

4. The turbine engine of claim 3, wherein the pin operably couples adjacent segments of the plurality of segments to one another.

5. The turbine engine of claim 3, wherein the pin extends circumferentially about an entirety of the rotational axis.

6. The turbine engine of claim 1, wherein the carriage assembly extends circumferentially about an entirety of the rotational axis.

7. The turbine engine of claim 1, wherein the seal assembly is provided entirely axially within the seal cavity.

8. The turbine engine of claim 1, further comprising an internal passage provided within one of either the carriage assembly or the seal body.

9. The turbine engine of claim 8, wherein the internal passage is fluidly coupled to the biasing element.

10. The turbine engine of claim 1, wherein the biasing element is a garter spring.

11. The turbine engine of claim 1, wherein the seal body includes a circumferential channel, with the biasing element being provided within the circumferential channel.

12. The turbine engine of claim 1, further comprising a turbine section with the seal assembly being provided within the turbine section.

13. The turbine engine of claim 1, wherein the carriage assembly includes a protrusion extending radially into the seal seat, and the seal assembly includes a pin extending through the protrusion and coupling at least two adjacent segments of the plurality of segments to one another.

14. The turbine engine of claim 1, wherein the stator comprises a static vane mounted to the core casing, the carriage assembly carried by the static vane.

15. The turbine engine of claim 1, wherein the core casing at least partially defines a working fluid path of the turbine engine;

the stator extends through the working fluid path; and a working fluid flows through the working fluid path during operation of the turbine engine, a leakage fluid of the working fluid within an area of the working fluid path local to the seal assembly configured to flow into the seal assembly, and the seal body being radially moveable with respect to the rotor through introduction of the leakage fluid into the seal assembly.

16. A turbine engine comprising:

a stator;

a rotor rotatable about a rotational axis; and a seal assembly comprising:

a carriage assembly carried by the stator and having a seal seat defining a seal cavity, the carriage assembly including a flange extending into the seal cavity;

a seal body within the seal cavity and having a first seal face confronting the rotor and a second seal face, opposite the first seal face, confronting the seal cavity, the seal body having a seat sized to receive a respective portion of the flange, the seat extending radially inward into the seal body and forming an opening along the second seal face; and a biasing element provided within the seal cavity and biasing the seal body radially against the rotor.

17. The turbine engine of claim 16, wherein the carriage assembly includes a carriage body and the flange extends radially inward from the carriage body.

18. A turbine engine comprising:

a core casing;

a stator extending from the core casing;

a rotor rotatable about a rotational axis; and a seal assembly comprising:

a carriage assembly carried by the stator and being radially spaced from the core casing; with respect to the rotational axis, the carriage assembly having a carriage body defining a seal seat and a seal cavity, the carriage body including a protrusion extending radially into the seal cavity;

a seal body within the seal cavity and having a first seal face confronting the rotor and a second seal face, opposite the first seal face, confronting the seal cavity, and a biasing element provided within the seal cavity and biasing the seal body radially against the rotor;

wherein the biasing element extends into a respective portion of the protrusion and is coupled to the carriage assembly through a pin extending through a respective potion of the biasing element.

* * * * *